United States Patent [19]
Teshigawara et al.

[11] Patent Number: 5,561,455
[45] Date of Patent: Oct. 1, 1996

[54] COLOR IMAGE FORMING APPARATUS

[75] Inventors: Toru Teshigawara; Haruyuki Nanba; Toshiaki Sagara; Yasuki Yamauchi; Takuto Tanaka, all of Ebina, Japan

[73] Assignee: Fuji Xerox Co., Ltd., Tokyo, Japan

[21] Appl. No.: 321,520

[22] Filed: Oct. 12, 1994

[30] Foreign Application Priority Data

Dec. 2, 1993 [JP] Japan .................................. 5-302843

[51] Int. Cl.⁶ ..................................................... H04N 1/21
[52] U.S. Cl. .......................... 347/131; 347/254; 358/296
[58] Field of Search .................................. 347/251, 252, 347/253, 254, 131, 115, 232; 358/296, 300, 302, 298

[56] References Cited

U.S. PATENT DOCUMENTS 4,626,901  12/1986  Tanioka .................................. 358/296

FOREIGN PATENT DOCUMENTS

| 59-121348 | 7/1984  | Japan . |
| 60-76766  | 5/1985  | Japan . |
| 60-95456  | 5/1985  | Japan . |
| 61-59356  | 3/1986  | Japan . |
| 63-66579  | 3/1988  | Japan . |
| 63-65459  | 3/1988  | Japan . |
| 63-65460  | 3/1988  | Japan . |
| 63-88573  | 4/1988  | Japan . |
| 63-298360 | 12/1988 | Japan . |
| 3-202869  | 9/1991  | Japan . |
| 3-290676  | 12/1991 | Japan . |

OTHER PUBLICATIONS

The Society of Electrophotography of Japan, "Japan Hardcopy '89," The Annual Conference of Japan Hardcopy for the Society of Electrophotography of Japan, Jul. 5–7, 1989.
Hajime Yamamoto, "One Drum Color Superimposing Process: Electrostatic Effect of the Toner Layer on the Image Formation," *Journal of the Society of Electrophotography*, vol. 30, No. 1, pp. 22–29, 1991.

*Primary Examiner*—Mark J. Reinhart
*Attorney, Agent, or Firm*—Oliff & Berridge

[57]  ABSTRACT

In a color image forming apparatus, a screen of each of electrostatic latent images to be formed by an exposing device has a parallel lines structure, and phases of the electrostatic latent images each having the parallel lines structure for at least two different colors are made different from each other. Accordingly, the color image forming apparatus can totally solve the problem caused by the rise in potential of exposed portions by toner charges and the dielectric property of toner layers and the problem caused by the toner shielding effect to thereby allow faithful reproduction of a highlight area important for a good halftone image, especially a high-quality color image.

9 Claims, 21 Drawing Sheets

|  | YELLOW | MAGENTA | CYAN |
|---|---|---|---|
| CHARGING POTENTIAL/V | +800 | +850 | +950 |
| POTENTIAL OF IMAGE AREA/V | +50 | +100 | +200 |
| VOLTAGE APPLIED TO DEVELOPING ROLLER/V | +700 | +800 | +900 |
| LATENT IMAGE CONTRAST/V | 750 | — | — |
| DEVELOPED IMAGE CONTRAST | 650 | 700 | — |

FIG.23

COLOR IMAGE FORMING APPARATUS

BACKGROUND OF THE INVENTION

1. Field of the Invention

The present invention relates to a digital xerographic color image forming apparatus for forming a color image by repeating charging of a photosensitive medium, exposure of the photosensitive medium to a light beam according to digital data for formation of an electrostatic latent image, and development of the electrostatic latent image plural times to thereby form toner images of a given number of colors on the photosensitive medium, and then collectively transferring these toner images of the given number of colors onto a recording medium.

2. Description of the Related Art

Such a digital xerographic color image forming apparatus is disclosed in Japanese Patent Laid-open No. 59-121348, for example. The technical background section of Japanese Patent Laid-open No. 59-121348 includes a description regarding a fundamental color electrophotographic system for forming a color image by repeating charging, exposure, and development to a photosensitive member by times corresponding to a required number of colors to thereby form toner images of the required number of colors in a layered or registered condition on the photosensitive member, and then collectively transferring all the toner images onto a recording medium. Of such a color electrophotographic system, there is a specific system including a required number of developing units corresponding to the required number of colors, a single charging unit, and a single exposing unit, wherein the single charging unit and the single exposing unit are repeatedly used by rotation of the photosensitive member. Accordingly, this specific system has a decreased number of components, thereby allowing a reduction in machine size and a reduction in cost. In addition, since the toner images of plural colors are formed in a registered condition on the single photosensitive member, misregistration of picture elements of the plural colors can be reduced with the result that a high-quality color image with less misregistration in color can be provided in principle. In the color electrophotographic system mentioned above and similar color electrophotographic systems in the related art to be mentioned hereinafter, the exposure for the second and next colors is applied on the same area of the photosensitive member as that for the first color, and the toner images of the second and next colors are registered with the toner image of the first color, thus forming all the toner images in the registered condition on the photosensitive member.

However, a color image forming apparatus employing such a system of forming a color image by registering the plural colored toner images on the photosensitive member has the following problem as known from a literature of "Color Electrophotographic Process; Registration of Toner Images on Photosensitive Member" (NIP-7, Japan Hardcopy, '89 collection of papers). That is, a so-called toner shielding effect such that a toner image previously formed on the photosensitive member hinders the exposure to be next performed and a rise in potential of charged toner layers due to sequential registration of the charged toner layers on the photosensitive member have an influence on a potential of electrostatic latent images to be formed on the photosensitive member, reducing tone reproduction and resolution. Further, such a color image forming apparatus also has the following problem as pointed out in a literature of "Color Electrophotographic Process by Color Registration Development" (Journal of the Society for Electrophotography, Vol. 30, No. 1, 1991). That is, a reduction in resolution is caused by a rise in potential of exposed portions such that a potential of the photosensitive member is not enough decreased even by the exposure because of electrostatic charges of the toner layers sequentially superimposed on the photosensitive member and by a dielectric property of the toner layers sequentially superimposed on the photosensitive member.

As described above, the color electrophotographic system for forming a color image by repeating charging, exposure, and development to the photosensitive member by times corresponding to a required number of colors to thereby form the toner images of the required number of colors in a registered condition on the photosensitive member, and then collectively transferring all the toner images onto the recording medium has excellent features that it can reduce a machine size and a cost and can provide a high-quality color image with less color misregistration in principle. On the other hand, however, the color electrophotographic system mentioned above also has some problems that the rise in potential of the toner layers, the dielectric property of the toner layers, and the toner shielding effect cause a deterioration in image quality, that is, a serious adverse effect on the image quality of the color image.

Of these problems adversely affecting the image quality of the color image, the problem caused by the rise in potential of the toner layers (or the rise in potential of the unexposed portions due to the charges of the toner layers) is most connected with the deterioration in image quality in the system of forming the color image by registering the plural colored toner images on the photosensitive member. It is therefore greatly important to solve this problem caused by the rise in potential of the toner layers or the like.

Some technical means of solving the problem caused by the rise in potential of the toner layers or the like have already been proposed in Japanese Patent Laid-open Nos. 63-88573 and 3-202869, for example. More specifically, Japanese Patent Laid-open No. 63-88573 discloses a color electrophotographic apparatus for forming plural toner images of different colors on a photosensitive member by repeating a cycle of charging, exposure, and development plural times, wherein there is provided means for stepwise increasing a charging potential of the photosensitive member with the repetition of the cycle. In more detail, a charging potential of the photosensitive member, a potential of an image area, and a voltage applied to a developing roller (i.e., a developing bias) are increased in the order of the first color (yellow), the second color (magenta), and the third color (cyan) as shown in FIG. 23, thereby making a contrast potential between an image area and a nonimage area in a toner clinging portion of the photosensitive member larger than that in a conventional system. Thus, the problem caused by the rise in potential of the toner layers or the like is intended to be solved.

On the other hand, Japanese Patent Laid-open No. 3-202869 mentioned above discloses a color image forming apparatus comprising an electrostatic latent image forming member, first charging means provided around the electrostatic latent image forming member, second charging means provided around the electrostatic latent image forming member, exposing means provided around the electrostatic latent image forming member, developing means provided around the electrostatic latent image forming member and storing different colored toner particles adapted to be charged with the same polarity as that of the electrostatic latent image forming member, control means provided around the electrostatic latent image forming member for controlling the polarity and a charge amount of the different colored toner particles on the electrostatic latent image forming member, and transferring means provided around the electrostatic latent image forming member, wherein the first charging means, the second charging means, the exposing means, the developing means, the control means, and the transferring means are arranged in this order along a direction of movement of the electrostatic latent image forming member, and the different colored toner particles on the electrostatic latent image forming member are reversely developed to be superimposed with each other. In this color image forming apparatus, a surface potential of the electrostatic latent image forming member having passed the first charging means is made larger than a surface potential of the electrostatic latent image forming member having passed the second charging means. In this manner, after the electrostatic latent image forming member is charged by the first charging means to acquire a first charging potential or more required for development, the charges on the electrostatic latent image forming member are erased by the second charging means so that a charging potential of the electrostatic latent image forming member becomes lower than the first charging potential, and the polarity of the toner on the electrostatic latent image forming member is reversed, thereby intending to eliminate a reduction in contrast potential at a color registered portion on the electrostatic latent image forming member and prevent toner splash upon exposure.

Further, various technical means of solving the problem caused by the toner shielding effect have already been proposed in Japanese Patent Laid-open Nos. 63-65460, 63-66579, 63-65459, 63-298360, and 3-290676, for example. According to these technical means, exposure conditions in forming images of the second and next colors are changed from previous exposure conditions.

Japanese Patent Laid-open No. 63-65460 mentioned above discloses a multicolor image forming method comprising the steps of uniformly charging an image forming member composed of a conductive substrate and a photoconductive layer formed on the conductive substrate, exposing the image forming member to light according to an image signal for a given color to form a latent image, reversely developing the latent image with a colored toner corresponding to the given color, repeating the steps of charging, exposing, and developing for plural predetermined colors in given order to thereby form a multicolor toner image on the image forming member, and transferring the multicolor toner image onto a transfer member to thereby form a multicolor image on the transfer member, wherein an exposure intensity in forming the latent image on the image forming member is sequentially increased as the steps of charging, exposing, and developing for the plural colors proceed.

Japanese Patent Laid-open No. 63-66579 discloses a multicolor image forming method comprising the same steps as those of the method disclosed in Japanese Patent Laid-open No. 63-65460, wherein an exposure time per picture element in forming the latent image on the image forming member is sequentially increased as the steps of charging, exposing, and developing for the plural colors proceed.

Japanese Patent Laid-open No. 63-65459 discloses a multicolor image forming method comprising the same steps as those of the method disclosed in Japanese Patent Laid-open No. 63-65460, wherein a light beam diameter for exposure in forming the latent image on the image forming member is sequentially increased by beam diameter control means as the steps of charging, exposing, and developing for the plural colors proceed.

Japanese Patent Laid-open No. 63-298360 discloses a color electrophotographic apparatus comprising image signal generating means for generating an optical image signal, a photosensitive member having a form of drum and adapted to rotate in a circumferential direction of the drum, the optical image signal generated from the image signal generating means being written on the photosensitive member to form electrostatic latent images, an image optical system for imaging the optical image signal on the photosensitive member, charging means for preliminarily uniformly charging the photosensitive member, a plurality of developing means for developing the electrostatic latent images formed on the photosensitive member by using different developers to thereby form toner images on the photosensitive member, transferring means for transferring the toner images onto paper, feed control means for feeding the paper in synchronism with rotation of the photosensitive member, photosensitive member cleaning means for removing a part of the developers left on the photosensitive member and not transferred onto the paper to clean the photosensitive member, fixing means for fixing the toner images transferred onto the paper, photosensitive member driving means for rotating the photosensitive member, and control means for controlling drive of the image signal generating means, selective operation for selecting one of the plural developing means, operation of the transferring means, control operation of the feed control means, operation of the cleaning means, operation of the fixing means, and operation of the photosensitive member driving means, wherein the control means determines a portion of the photosensitive member where the optical image signal is written and a portion of the photosensitive member where the optical image signal is not written when the image signal generating means generates the optical image signal for development by one of the plural developing means previously selected, stores write address information of the optical image signal into a memory, reads the write address information stored in the memory when the image signal generating means generates the optical image signal for development by one of the plural developing means next selected, determines a portion of the photosensitive member where the optical image signal is to be written and a portion of the photosensitive member where the optical image signal is not to be written, and controls a light quantity of the optical image signal.

Finally, Japanese Patent Laid-open No. 3-290676 discloses a multicolor recording apparatus for recording an image represented by at least first color information, first tone information, second color information, and second tone information in accordance with an electrophotographic system, wherein first exposure is performed according to the first color information and the first tone information to form a first electrostatic latent image, and second exposure is performed according to the second color information and the second tone information to form a second electrostatic latent image superimposed with the first electrostatic latent image with a light intensity for the second exposure being controlled according to the first tone information and the second tone information.

However, the techniques in the related art mentioned above have the following problems. In the color electrophotographic apparatus disclosed in Japanese Patent Laid-open No. 63-88573, the contrast potential between the image area and the nonimage area (i.e., the contrast potential of the latent image) for the second and next colors can be made larger than that in the conventional apparatus as shown in FIG. 23 (in connection with this, the contrast potential for the second and next colors in the preferred embodiments of the present invention is 750 V which is the same as the contrast potential for the first color as will be hereinafter described). However, a developer image contrast having a more influence on an actual image density is not constant for each color. That is, the developed image contrast for the first color is 650 V, but the developed image contrast for the second and next colors is 700 V as shown in FIG. 23. As a result, the developed image density for each color varies to render difficult color reproduction with a stable synthetic color. Further, although not described in Japanese Patent Laid-open No. 63-88573, the potential of toner layers to be formed on the photosensitive member actually largely changes with the weight of developing toners per unit area. According to a test made by the present inventors, the potential of toner layers to be formed on the photosensitive member actually changes with the weight of developing toners per unit area as shown in FIG. 24. As understood from FIG. 24, the potential of toner layers in the range of 0.5 to 1.0 mg/cm$^2$ of the weight of developing toners which value is required for a high-quality color image becomes 60 to 120 V (absolute value), and the potential of the image area upon development for the third color rises up to a maximum value of 250 V or more corresponding to a value twice the potential of each toner layer, 120 V. Accordingly, in order to ensure a necessary latent image contrast (e.g., 750 V) in relation to the potential of the image area of the toner layers previously developed on the photosensitive member, the surface of the photosensitive member must be subjected to primary charging up to about 1000 V (i.e., the sum of the image area potential, 250 V and the latent image contrast, 750 V) upon image formation for the third color.

However, such primary charging of the surface of the photosensitive member to a high voltage of about 1000 V causes a partial deterioration of the photosensitive member to result in occurrence of whitening or black spots on the image. Additionally, such a technical means for sequentially increasing the charging potential of the photosensitive member with proceeding of the development cycles originally has no effect against the problem caused by the toner shielding effect. Accordingly, the exposure for the second and next colors is blocked by the toner layer previously formed on the photosensitive member, so that a desired contrast itself cannot be obtained. In particular, since a highlight area important for a high-quality color image has a low toner density and accordingly has a small weight of toner layers, the potential of toner layers on the photosensitive member in the highlight area is low as shown in FIG. 24. Accordingly, in the highlight area where the toner layers having a small weight are superimposed on the photosensitive member, the potential of the toner layer for the first color previously formed on the photosensitive member is low and a proportion of influence of this low potential to the potential of the image area for the second and next colors becomes relatively large. As a result, it is very difficult to faithfully reproduce a given tone at a given density in the highlight area.

In the color image forming apparatus disclosed in Japanese Patent Laid-open No. 3-202869, after the electrostatic latent image forming member is charged by the first charging means to acquire a first charging potential or more required for development, the charges on the electrostatic latent image forming member are erased by the second charging means so that a charging potential of the electrostatic latent image forming member becomes lower than the first charging potential, and the polarity of the toner on the electrostatic latent image forming member is reversed, thereby eliminating a reduction in contrast potential at a color registered portion on the electrostatic latent image forming member and preventing toner splash upon exposure. In this related art, the polarity of the toner on the surface of the electrostatic latent image forming member is reversed to cause a problem such that this toner reversed in its polarity jumps back to the developing unit for the next color to generate mixing of colors (so-called scavenging phenomenon). This phenomenon is remarkable especially when applying an AC bias component as a developing bias to the developing units for the second and next colors. In consideration of the fact that the application of the AC bias component to the developing units for the second and next colors is essential for the color image forming apparatus, this problem is fatal. In addition, the apparatus disclosed in Japanese Patent Laid-open No. 3-202869 has another problem such that the first and second, two charging means and two high-voltage power supplies are required to unavoidably cause an increase in size of the charging unit and an increase in cost.

On the other hand, in the technical means of solving the problem caused by the toner shielding effect as disclosed in Japanese Patent Laid-open Nos. 63-65460, 63-66579, 63-65459, 63-298360, and 3-290676, the exposure intensity, the exposure time per picture element, or the light beam diameter for exposure is sequentially increased as the steps of charging, exposing, and developing for the plural colors proceed; the light quantity of the optical image signal is controlled by determining a portion of the photosensitive member where the optical image signal is to be written and a portion or the photosensitive member where the optical image signal is not to be written; or the light intensity upon exposure for the second color is controlled according to the first tone information and the second tone information. All of these techniques can act as countermeasures against the problem caused by the toner shielding effect, but cannot act as countermeasures against the problem caused by the rise in potential of the exposed portions due to toner charges and the dielectric property of the toner layers. Thus, such techniques are not satisfactory in obtaining a high-quality color image.

SUMMARY OF THE INVENTION

It is accordingly an object of the present invention to provide a color image forming apparatus which can totally solve the problem caused by the rise in potential of exposed portions by toner charges and the dielectric property of toner layers and the problem caused by the toner shielding effect to thereby allow faithful reproduction of a highlight area important for a good halftone image, especially a high-quality color image.

According to the present invention, there is provided in a color image forming apparatus for forming a color image, including charging means for uniformly charging a surface of a photosensitive medium, exposing means for exposing the surface of the photosensitive medium charged by the charging means to a light beam scanning according to image information to form electrostatic latent images, and a plurality of developing means for selectively developing the electrostatic latent images formed on the photosensitive medium with toners of plural colors, wherein charging, exposure, and development on the photosensitive medium are repeated plural times to form toner images of a given number of colors, and the toner images of the given number of colors are collectively transferred onto a recording medium; the improvement wherein a screen of each of the electrostatic latent images to be formed by the exposing means has a parallel lines structure, and phases of the electrostatic latent images each having the parallel lines structure for at least two different colors are made different from each other.

Preferably, the plural colors of the toners comprise yellow, magenta, cyan, and black, and the phases of the electrostatic latent images for the yellow, the magenta, and the cyan are made different from each other.

More preferably, a product of the number of screen lines represented by the number of parallel lines of the parallel lines structure per inch and a space between the parallel lines forming the electrostatic latent images for two colors of the yellow, the magenta, and the cyan represented by a maximum phase shift of the two colors is not greater than 0.012 provided that a unit of measure of the space is meter, and the space is not greater than 0.00012 meter.

Preferably, the phases of the electrostatic latent images are shifted from each other by the exposing means.

More preferably, the exposing means has at least one of a scan start detecting circuit and a scan end detecting circuit, and the phases of the electrostatic latent images are shifted from each other by changing an intensity of the light beam entering at least one of the scan start detecting circuit and the scan end detecting circuit in forming the electrostatic latent images for the given number of colors.

Alternatively, the exposing means has at least one of a scan start detecting circuit and a scan end detecting circuit, and the phases of the electrostatic latent images are shifted from each other by an output signal from a computing circuit according to a detection signal from at least one of the scan start detecting circuit and the scan end detecting circuit.

Preferably, image processing means is provided to perform tone correction processing to an image signal to be transmitted to the exposing means, wherein tone correction data for the yellow, the magenta, and the cyan are different from each other.

Preferably, image processing means is provided to perform undercolor removal processing to an image signal to be transmitted to the exposing means, wherein a proportion of undercolor removal is not less than 50%.

Preferably, the phase of the electrostatic latent image having the parallel lines structure for the black is identical with the phase of the electrostatic latent image having the parallel lines structure for one of the yellow and the magenta.

The color image forming apparatus according to the present invention has an essential feature that a screen of each of the electrostatic latent images to be formed by the exposing means has a parallel lines structure, and phases of the electrostatic latent images each having the parallel lines structure for at least two different colors are made different from each other. Accordingly, in forming the plural toner images on the photosensitive medium in an overlapping condition, a degree of overlap of the plural toner images can be reduced. As a result, the influence caused by the rise in potential of exposed portions by toner charges of the plural toner images and the dielectric property of the toner layers and the influence caused by the toner shielding effect can be simultaneously reduced to thereby allow faithful reproduction of a highlight area important for a good halftone image, especially a high-quality color image.

Other objects and features of the invention will be more fully understood from the following detailed description and appended claims when taken with the accompanying drawings.

BRIEF DESCRIPTION OF THE DRAWINGS

FIG. 23 is a table showing image formation parameters in a conventional color image forming apparatus.

DETAILED DESCRIPTION OF THE PREFERRED EMBODIMENTS

First Preferred Embodiment

A first preferred embodiment of the electrophotographic color image forming apparatus according to the present invention will now be described with reference to the drawings.

Figure 2:
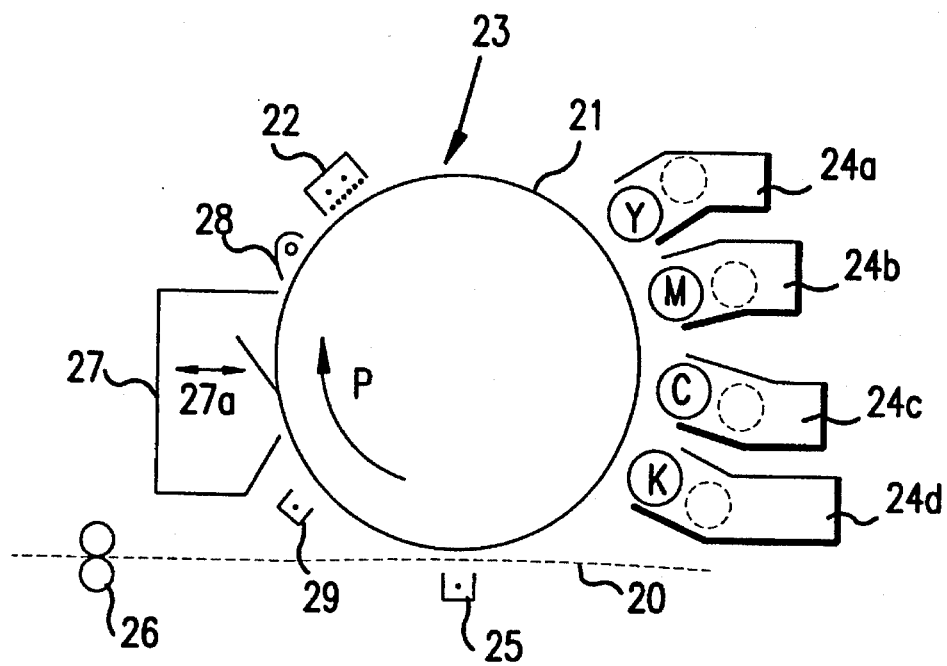
FIG. 2 is a schematic view illustrating the structure of a color image forming apparatus according to the first preferred embodiment.

Referring first to FIG. 2, reference numeral 21 denotes a photosensitive drum as the photosensitive medium according to the present invention. As known in the art, the photosensitive drum 21 has a thin surface layer of photoconductive material such as organic photoconductor. The photosensitive drum 21 is rotatably driven at a given speed in a direction depicted by an arrow P by driving means not shown. Provided around the photosensitive drum 21 are a scorotron charger 22 for uniformly charging the surface of the photosensitive drum 21, a laser exposing unit 23, four color developing units 24a, 24b, 24c, and 24d storing yellow, magenta, cyan, and black developers, respectively, a transfer charger 25, a static eraser 29, a cleaner 27 having a blade 27a adapted to come into contact with the photosensitive drum 21 in cleaning while moving away from the photosensitive drum 21 in image forming, and an erase lamp 28. These members are arranged in this order along the direction of rotation of the photosensitive drum 21. Further, a fuser 26 is provided in the vicinity of the photosensitive drum 21 to fuse and fix toner images transferred from the surface of the photosensitive drum 21 to a recording paper 20 as the recording medium according to the present invention after separated from the photosensitive drum 21.

Preferably, the scorotron charger 22 for uniformly charging the surface of the photosensitive drum 21 is a scorotron charger employing two or more discharging wires capable of stably performing uniform charge also in repeated image formation for the second and next colors.

Each of the color developing units 24a to 24d may be constructed of a known two-component developing device, for example. In particular, such a two-component developing device is preferably designed so that a two-component developer composed of a toner and a carrier is carried on a developing roller and bristles of the developer on the developing roller are opposed to the surface of the photosensitive drum 21 with a gap in such a manner that the tops of the bristles are separated from the toner image of the first color to be formed on the surface of the photosensitive drum 21 and the toner images of the second and next colors to be formed on or over the surface of the photosensitive drum 21. Further, a developing bias to be applied to the color developing units 24a to 24d is preferably set as a DC voltage superimposed with an AC voltage (i.e., DC voltage+AC voltage) so as not to disturb the toner images formed on or over the surface of the photosensitive drum 21 and so as to obtain a desired high image quality, wherein the AC component of the developing bias is adjusted, for example.

Figure 3:
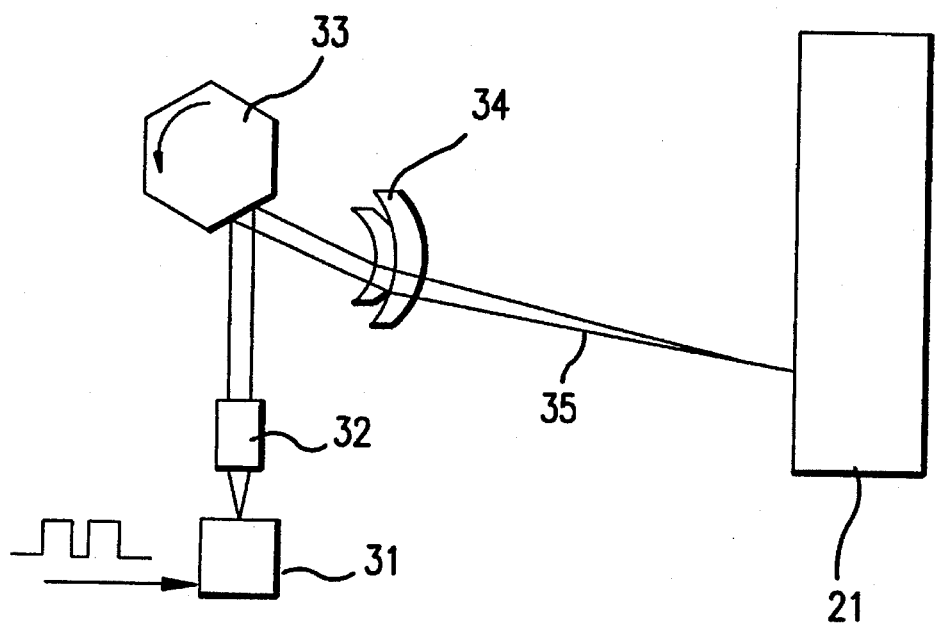
FIG. 3 is a schematic view illustrating the structure of a laser exposing unit in the color image forming apparatus shown in FIG. 2.

Referring to FIG. 3, there is schematically shown the configuration of the laser exposing unit 23 shown in FIG. 2. The laser exposing unit 23 is composed of a semiconductor laser 31 incorporating a laser control circuit, a collimator lens 32, a polygonal mirror 33, and an fθ lens 34. The semiconductor laser 31 is modulated to turn on and off by the laser control circuit according to exposure data 36 to output a laser beam 35 modulated by so-called pulse width modulation. The laser beam 35 output from the semiconductor laser 31 is transmitted through the collimator lens 32 and is directed on the surface of the polygonal mirror 33. Then, the laser beam 35 is reflected and deflected on the surface of the polygonal mirror 33 rotating at a high speed, and is transmitted through the fθ lens 34 to scan the surface of the photosensitive drum 21 in a horizontal scanning direction (an axial direction of the photosensitive drum 21), thereby forming an electrostatic latent image on the photosensitive drum 21.

In this preferred embodiment, a screen having a parallel lines structure is used to form the electrostatic latent image on the photosensitive drum 21. An image signal for formation of the electrostatic latent image with use of the screen having the parallel lines structure is generated by a screen generating circuit to be hereinafter described according to digital image data having tone information for each picture element to be printed and a reference clock.

Figure 4:
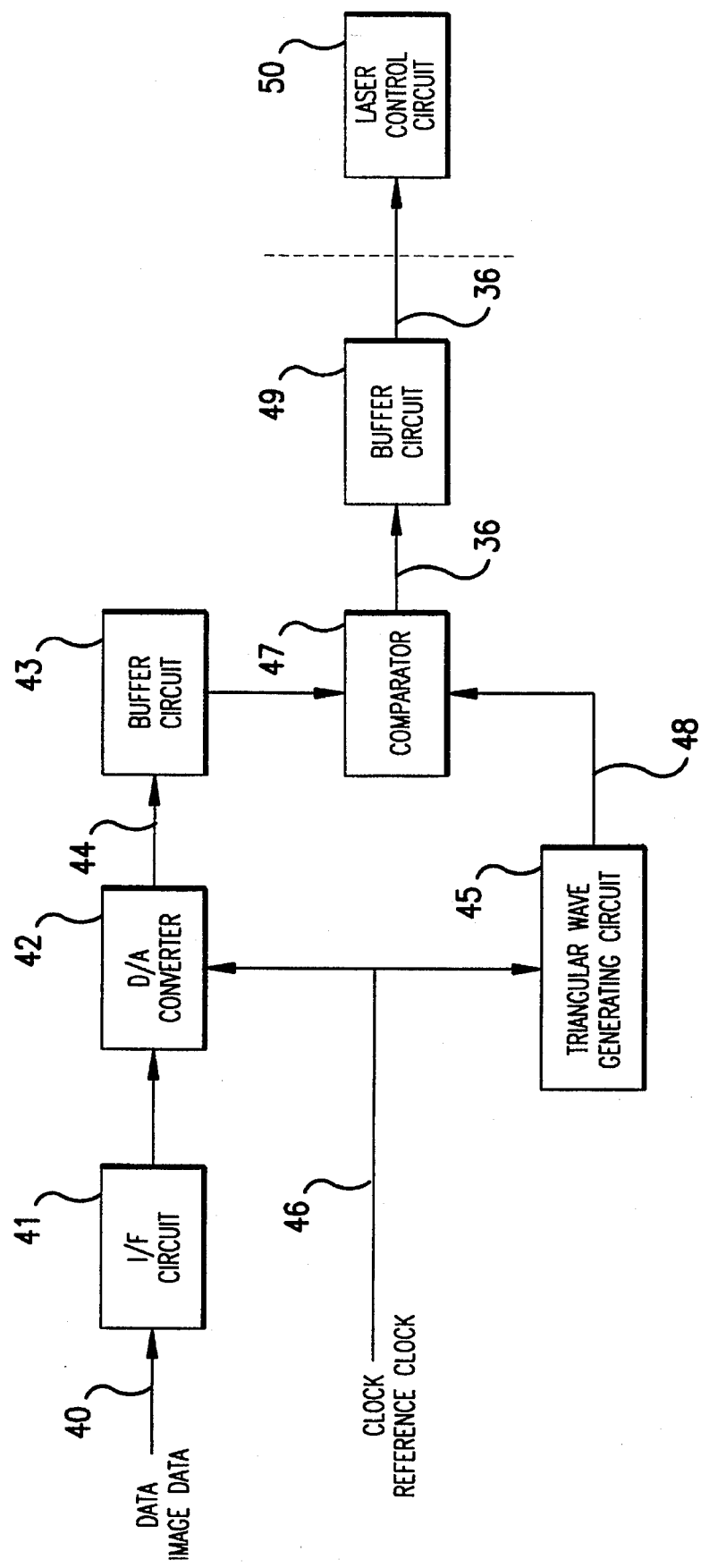
FIG. 4 is a block diagram of a screen generating circuit in the color image forming apparatus shown in FIG. 2.

Referring to FIG. 4 which shows a specific embodiment of the screen generating circuit, it includes an I/F circuit 41 for receiving image data 40 output from an image reading device, a host computer, etc. (not shown), a D/A converter 42 having a function of resolving the image data 40 output from the I/F circuit 41 into 8-bit quantized data (256 gray levels) 44, a buffer circuit 43 for temporarily storing the 8-bit quantized data 44 output from the D/A converter 42, a triangular wave generating circuit 45 for generating a triangular wave signal 48 according to a reference clock 46, a comparator 47 for comparing the 8-bit quantized data 44 output from the buffer circuit 43 and the triangular wave signal 48 output from the triangular wave generating circuit 45, and a buffer circuit 49 for temporarily storing image data 36 output from the comparator 47. Reference numeral 50 denotes a laser control circuit for controlling the semiconductor laser 31 according to the image data 36 output from the buffer circuit 49.

The screen generating circuit having the above configuration operates in the following manner. When the image data 40 having tone information for each picture element to be printed is input from the image reading device, the host computer, etc. through the I/F circuit 41 into the D/A converter 42, the image data 40 is D/A converted according to the reference clock 46 by the D/A converter 42 having a resolution to the 8-bit quantized data 44. The image data 40 thus converted into the analog image data 44 is then input through the buffer circuit 43 into the comparator 47. On the other hand, the triangular wave signal 48 is generated from the triangular wave generating circuit 45 in synchronism with the reference clock 46 and is input into the comparator 47. The triangular wave signal 48 and the image data 44 are compared in the comparator 47, and pulses having durations proportional to the tone information of the image data 44 are generated from the comparator 47. The output pulses from the comparator 47 are input as the exposure data 36 through the buffer circuit 49 into the laser control circuit 50.

Figure 5:
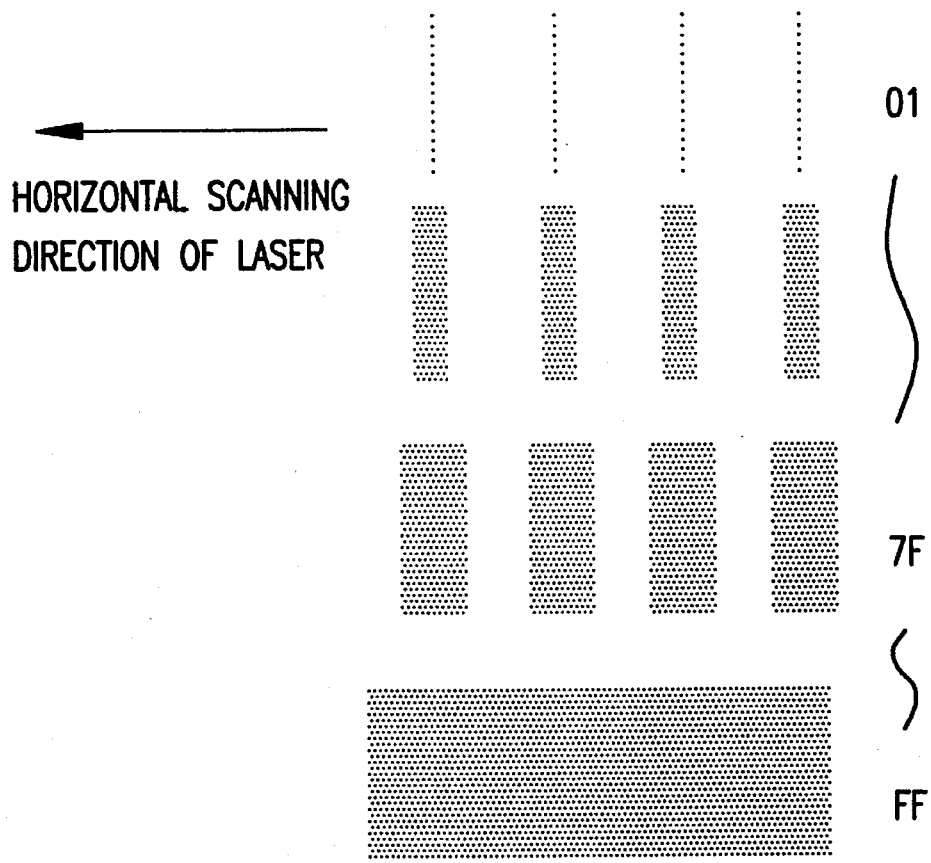
FIG. 5 is a view illustrating a parallel lines screen formed by the screen generating circuit.
Figure 6:
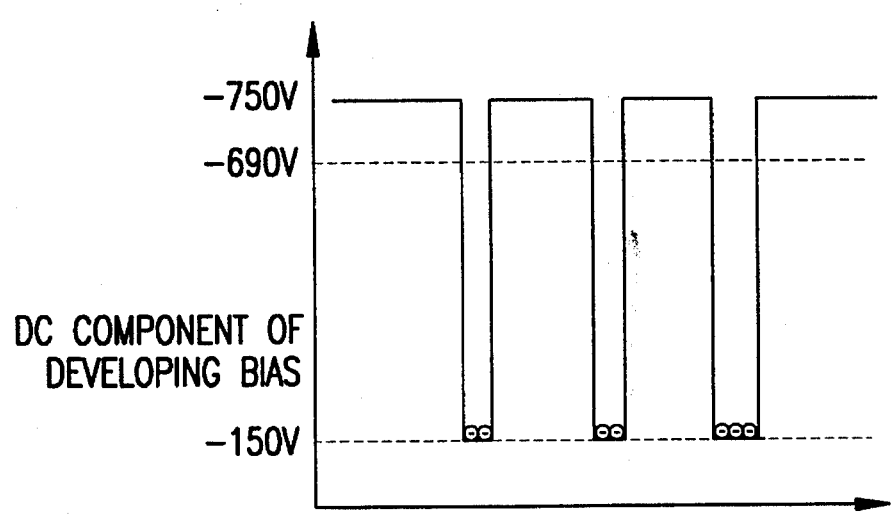
FIG. 6 is a graph showing the potential of an electrostatic latent image.

In this manner, the screen generating circuit mentioned above generates the exposure data 36 employing a parallel lines screen arranged in the horizontal scanning direction of the laser beam 35 at a given pitch according to a period of the triangular wave. FIG. 5 shows a schematic view of an electrostatic latent image by the parallel lines screen arranged in the horizontal scanning direction of the laser beam 35. According to the exposure data 36 of the photosensitive screen "00 to FF" (corresponding to 0 to 255 steps of 8-bit resolution) generated by the screen generating circuit, the semiconductor laser 31 connected to the laser control circuit 50 is turned on to erase the electrostatic charge at an exposed portion of the surface of the photosensitive drum 21, resulting in a potential contrast between the exposed portion and an unexposed portion of the surface of the photosensitive drum 21 as shown in FIG. 6. The potential contrast formed on the photosensitive drum 21 causes the electrostatic latent image. In this preferred embodiment, the parallel lines are formed at a pitch of 200 lines/in, for example; however, the pitch of the parallel lines may be set to another value, of course, by changing the period of the triangular wave. Further, another parallel lines screen inclined at a given angle to the horizontal scanning direction may be used. Although FIG. 5 schematically shows the electrostatic latent image in the form of uniform bands, the edge shape of the electrostatic latent image actually becomes a smooth edge shape because the intensity distribution of the laser beam 35 is a Gaussian distribution and the frequency response of the laser control circuit 50 is limited. The electrostatic latent image thus formed has a potential of −150 V, for example, except the edge.

In this preferred embodiment, the phases of the electrostatic latent images having parallel lines structures for at least two different colors are made different. That is, while each electrostatic latent image is formed on the photosensitive drum 21 according to the image data 36 having a parallel lines structure generated by using the screen generating circuit as mentioned above, the phases of the electrostatic latent images for the first color and the second color are made different. More specifically, the phases of the electrostatic latent images for the first color and the second color are shifted from each other by 30 μm.

To make different the phases of the electrostatic latent images having the parallel lines structures for the first color and the second color, an internal clock of the laser exposing unit 23 in performing scan exposure by the laser beam 35 for the second color is shifted before that for the first color by a given time, e.g., by a half phase of the internal clock.

In the color image forming apparatus according to the first preferred embodiment mentioned above, the formation of a color image is performed in the following manner. As shown in FIG. 2, the surface of the photosensitive drum 21 enough optically erased in electrostatic charge by the erase lamp 28 as required or the surface of the photosensitive drum 21 in its initial state is uniformly charged to −750 V, for example, by the scorotron charger 22. Of course, the charging potential and the charging polarity of the photosensitive drum 21 may be suitably changed according to a developing efficiency and other conditions. Then, the surface of the photosensitive drum 21 thus uniformly charged by the scorotron charger 22 is exposed to the laser beam 35 by the laser exposing unit 23 according to the exposure data 36 for the first color, thereby forming an electrostatic latent image for the first color on the photosensitive drum 21. The electrostatic latent image on the photosensitive drum 21 is formed by the parallel lines at a pitch of 200 lines/in, for example, as shown in FIG. 5, and the potential of the electrostatic latent image except its edge is reduced to −150 V.

Then, the electrostatic latent image for the first color formed on the photosensitive drum 21 is reversely developed by the negatively charged yellow toner stored in the yellow color developing unit 24a for the first color or yellow. At this time, a DC voltage of −690 V superimposed with an AC voltage of $1.5 kV_{p-p}$ having a frequency of 5 kHz is applied as a developing bias to the yellow color developing unit 24a. As a result, the yellow toner clings to the electrostatic latent image formed on the photosensitive drum 21 substantially along the shape of the parallel lines, thereby forming a yellow toner image on the photosensitive drum 21. In each of the color developing units 24a to 24d, toner particles each having a diameter of about 7 μm are employed to allow attachment of the toner faithful to the parallel lines.

Thereafter, an image forming step for the second color is performed. That is, the surface of the photosensitive drum 21 on which the yellow toner image has been formed is not subjected to transferring and cleaning steps, but is uniformly charged to −750 V again by the scorotron charger 22. Prior to this charging step, the surface of the photosensitive drum 21 may be erased in electrostatic charge by the static eraser 29 as a pretreatment for the second color image forming step.

Figure 1:
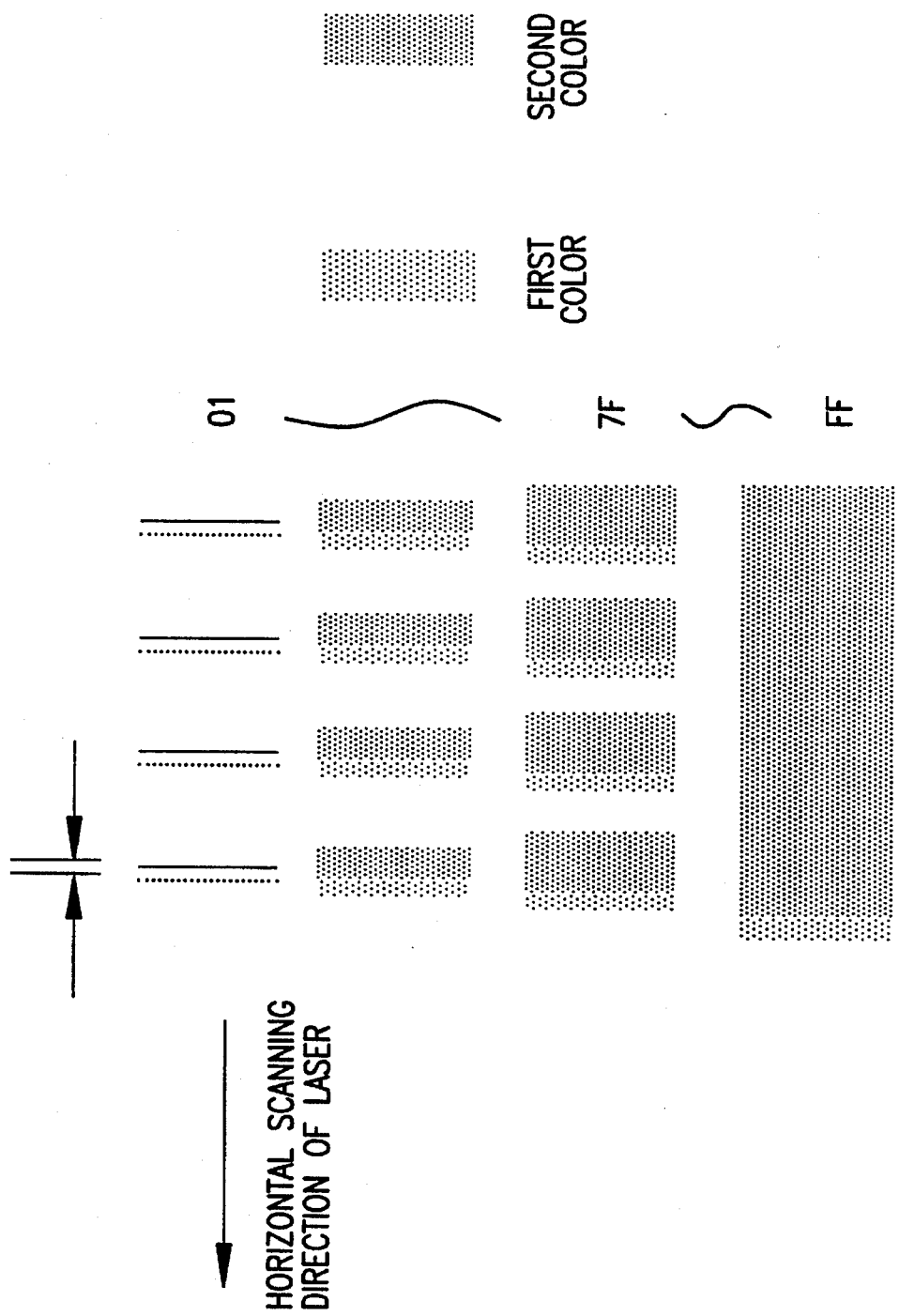
FIG. 1 is a view illustrating the parallel lines structures of electrostatic latent images for different colors according to a first preferred embodiment of the present invention.

Then, the surface of the photosensitive drum 21 is exposed to the laser beam 35 by the laser exposing unit 23 according to the image data 36 for the second color, thereby forming an electrostatic latent image for the second color. At this time, the center of each of the parallel lines forming the electrostatic latent image for the second color is shifted in phase by 30 μm from that of the parallel lines forming the electrostatic latent image for the first color to the upstream side in the horizontal scanning direction of the laser beam 35 as shown in FIG. 1. The potential of the electrostatic latent image for the second color except its edge is reduced to −170 V, for example, under the influence of the charging potential of the yellow toner image for the first color previously formed. Although the parallel lines forming the electrostatic latent image for the second color are formed on the upstream side of the parallel lines forming the electrostatic latent image for the first color in the horizontal scanning direction of the laser beam 35, the former may be formed on the downstream side of the latter in the horizontal scanning direction of the laser beam 35.

Then, the electrostatic latent image for the second color thus formed on the photosensitive drum 21 is developed by the magenta color developing unit 24b for the second color or magenta with the same developing parameters as those for the first color, thereby forming a magenta toner image on the photosensitive drum 21. Although yellow and magenta are used as the first color and the second color, respectively, in this preferred embodiment, magenta may be used as the first color and yellow may be used as the second color. Further, other different colors may be suitably combined and the order of the colors may also be suitably selected.

Thereafter, an image forming step for the third color is performed. That is, the surface of the photosensitive drum 21 on which the yellow toner image and the magenta toner image have been formed is uniformly charged again to −750 V by the scorotron charger 22. Prior to this charging, the surface of the photosensitive drum 21 may be erased in electrostatic charge by the static eraser 29 as a pretreatment for the third color image forming step. Then, the surface of the photosensitive drum 21 is exposed to the laser beam 35 by the laser exposing unit 23 according to the image data 36 for the third color, thereby forming an electrostatic latent image for the third color on the photosensitive drum 21. At this time, the phase of the parallel lines forming the electrostatic latent image for the third color is made identical with the phase of the parallel lines forming the electrostatic latent image for the first color, so that the electrostatic latent image for the third color is registered with the electrostatic latent image for the first color. The potential of the electrostatic latent image for the third color except its edge is reduced to −200 V, for example. Although the phase of the parallel lines for the third color is made identical with that for the first color in this preferred embodiment, the phase of the parallel lines for the third color may be made identical with that of the second color.

Then, the electrostatic latent image for the third color formed on the photosensitive drum 21 is developed by the cyan color developing unit 24c for the third color or cyan with the same developing parameters as those for the first color, thereby forming a cyan toner image on the photosensitive drum 21. Thereafter, similar image forming steps including development of other different colors may be repeated as required.

Then, the toner images of the three colors thus formed on the photosensitive drum 21 are collectively transferred onto the recording paper 20 by the transfer charger 25 such as a transfer corotron, and the recording paper 20 onto which the toner images have been thus transferred is then separated from the photosensitive drum 21 to be fed to the fuser 26. The recording paper 20 is passed through the fuser 26 to thereby fix the toner images by heat and pressure, thus forming a color image on the recording paper 20.

Thereafter, the remaining toners and the hysteresis of charging on the photosensitive drum 21 are successively removed by the cleaner 27 and the erase lamp 28 to complete one cycle of the color image formation.

According to the first preferred embodiment, the phases of the electrostatic latent images for the first color and the second color are made different from each other in such a manner that the phases of the parallel lines for the first color and the second color are shifted from each other as shown in FIG. 1. Accordingly, the problem to be caused by the rise in toner potential and the dielectric property of the toner layers and the problem to be caused by the toner shielding effect both due to the formation of the plural toner images on the photosensitive drum 21 can be simultaneously solved in the following manner.

Figure 7A:
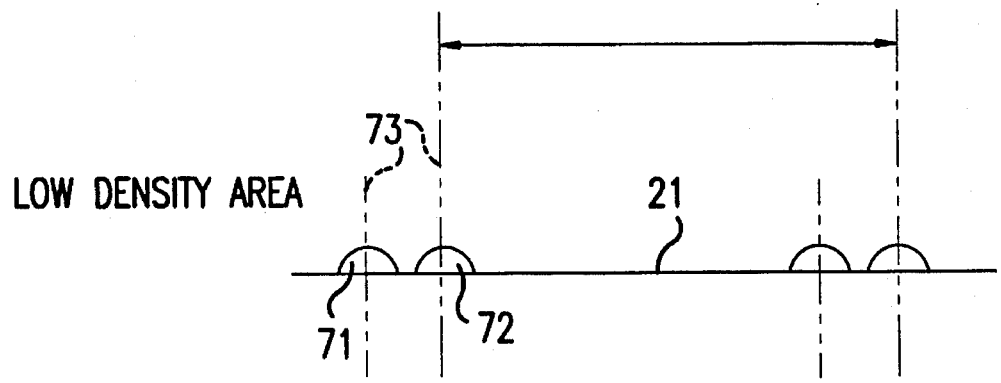
FIGS. 7A, 7B, and 7C are schematic cross sections of toner images formed on a photosensitive drum in different density areas according to the first preferred embodiment.
Figure 7B:
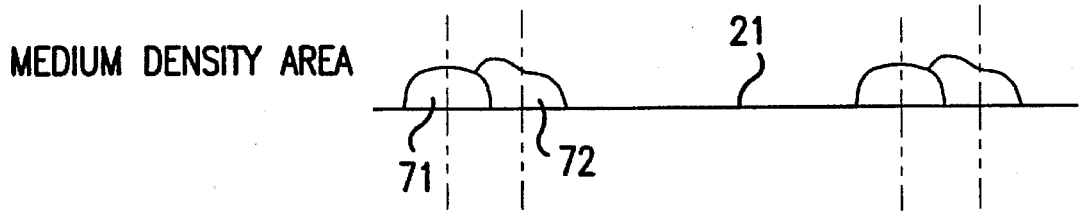
Figure 7C:
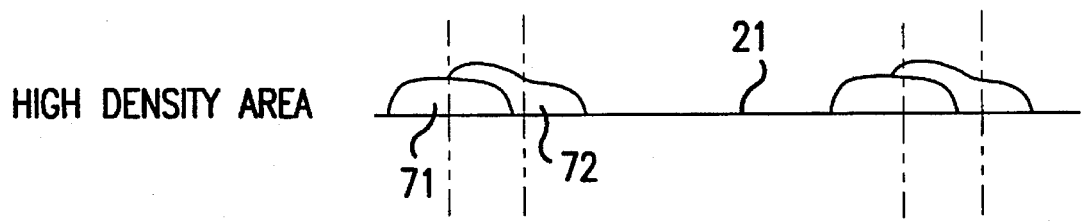

FIGS. 7A to 7C show the overlap of a yellow toner image 71 and a magenta toner image 72 formed on the photosensitive drum 21 in cross section. Reference numeral 73 denotes the center of the parallel lines structure forming the electrostatic latent image for each color. As shown in FIGS. 7A to 7C, the yellow toner image 71 and the magenta toner image 72 are less overlapped in a low density area where a toner density is low, i.e., in a highlight area (or there is also a lightest highlight area where both toner images 71 and 72 are not overlapped as shown in FIG. 7A). In a medium density area and a high density area, the overlap of the yellow toner image 71 and the magenta toner image 72 becomes more. That is, the higher the toner density, the more the overlap of both toner images 71 and 72.

Figure 8:
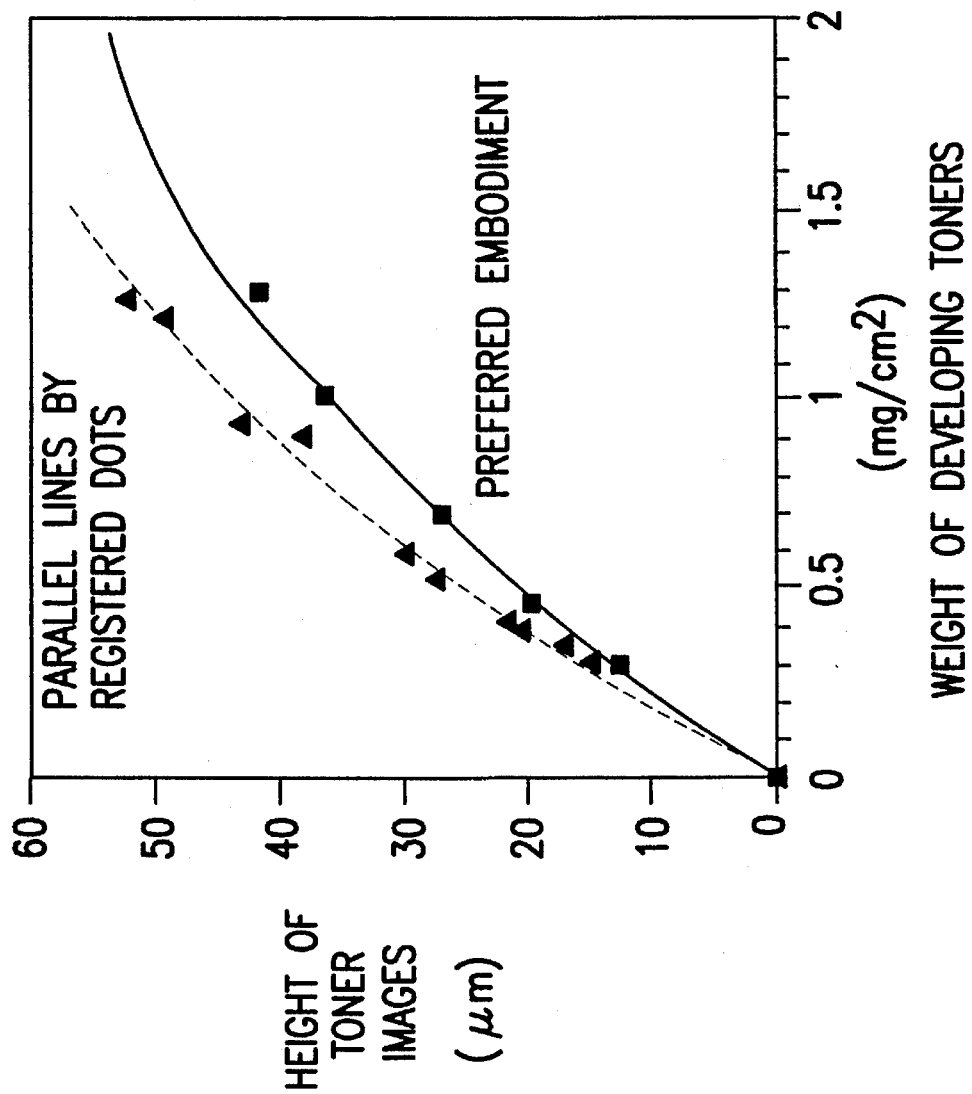
FIG. 8 is a graph showing the relation between the weight of developing toners and the height of toner images according to the first preferred embodiment.

The heights of the toner images 71 and 72 are different depending on the density areas. In comparison with the related art wherein registered toner images (yellow toner image+magenta toner image) are formed by registering dots to form registered electrostatic latent images for both colors, there is shown in FIG. 8 the total height of the toner images formed by shifting the phase of the parallel lines for the second color according to the first preferred embodiment. That is, FIG. 8 shows a comparison in total height of the toner images between the first preferred embodiment wherein the toner images are actually formed on the photosensitive drum 21 by using the parameters mentioned above and the related art wherein the toner images are actually formed on the photosensitive drum 21 with use of the same parameters as those in the first preferred embodiment by the method of registering the electrostatic latent images for both colors at the same position.

Figure 9:
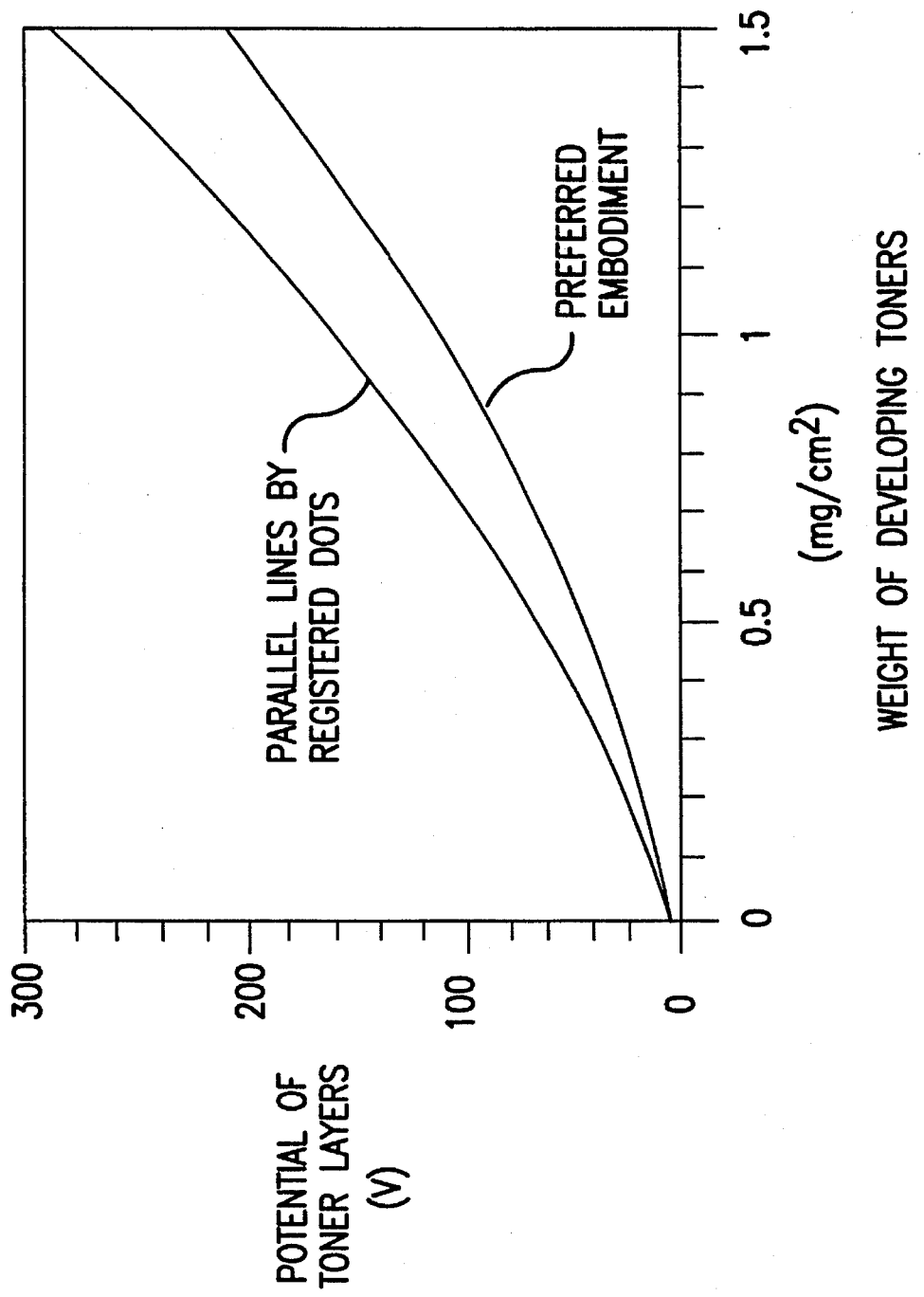
FIG. 9 is a graph showing the relation between the weight of developing toners and the potential of toner layers according to the first preferred embodiment.
Figure 10:
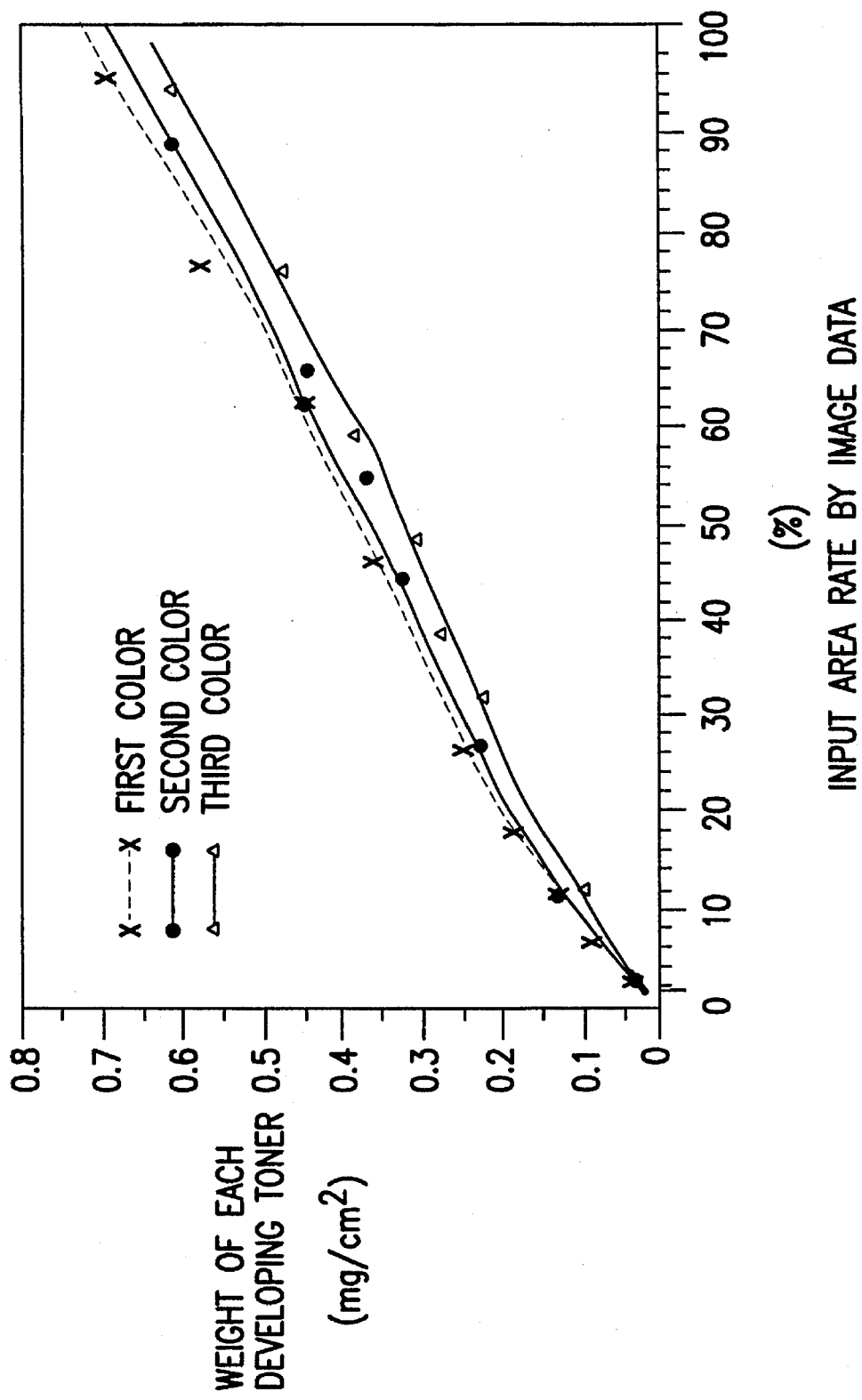
FIG. 10 is a graph showing the relation between the input area rate by image data and the weight of each developing toner according to the first preferred embodiment.

As apparent from FIG. 8, the total height of the toner images formed by shifting the phase of the parallel lines according to the first preferred embodiment is lower than that in the related art, and the larger the weight of the developing toners, the more remarkable the above tendency. The degree of the overlap of both toner images is increased with an increase in the weight of the developing toners. Accordingly, it would be anticipated that the total height of the toner images according to the first preferred embodiment may become equal to that in the related art when the weight of the developing toners is large. In actual, however, there is a difference in the total height between the first preferred embodiment and the related art even near a toner weight of 1.3 mg/cm$^2$ which is a saturation point of the weights of the yellow toner and the magenta toner. FIG. 9 shows the potential of the toner layers in relation to the weight of the developing toners. As apparent from FIG. 9, the potential of the toner layers according to the first preferred embodiment is lower than that in the related art at the same weight of the developing toners. Accordingly, the influence of the potential of the toner layers previously formed can be reduced in developing the electrostatic latent image for the third color, thereby allowing the same weight of the developing toner for development of the electrostatic latent image for the third color as that for the first color or the second color. Further, as shown in FIG. 7A, the toner images are less overlapped in the highlight area where the weight of the developing toners is small. Accordingly, the dielectric influence due to the height (thickness) of the toner images can be eliminated to allow recording of a good highlight image. In addition, the influence due to the overlap of the yellow toner image 71 and the magenta toner image 72 is less than that in the related art in performing the exposure for the third color or cyan. Accordingly, loss such as transmission through the toner layers and scattering at the interface can be reduced. FIG. 10 shows a difference in development characteristics of the parallel lines between the first, second, and third colors according to the first preferred embodiment. As apparent from FIG. 10, the development characteristics for the second and third colors can be made substantially identical with those for the first color.

As apparent from FIGS. 8 to 10, according to the first preferred embodiment, even when the yellow toner image and the magenta toner image are formed on the photosensitive drum 21, the height of the toner images and the potential of the toner layers can be made lower than those in the related art. Accordingly, a reduction in resolution and toning due to the rise in toner potential, the dielectric property of the toner layers, and the toner shielding effect can be suppressed to thereby prevent a deterioration in image quality and allow the formation of a good halftone image. This effect is remarkable in the medium density area and especially in the low density area where the amount of the toner layers on the photosensitive drum 21 is relatively small. Accordingly, faithful reproduction of the highlight area important for a high-quality color image can be obtained.

Thus, according to the first preferred embodiment, the rise in toner potential, the dielectric property of the toner layers, and the toner shielding effect can be synthetically solved to thereby effect faithful reproduction of the highlight area important for a good halftone image, especially a high-quality color image with the result that a defect such as a false outline due to a discontinuous change in tone does not occur to thereby obtain stable tone reproduction.

Second Preferred Embodiment

A second preferred embodiment of the color image forming apparatus according to the present invention will now be described with reference to the drawings, in which the same parts as those in the first preferred embodiment are denoted by the same reference numerals. Also in the second preferred embodiment, the color image forming apparatus shown in FIG. 2 is used.

In the second preferred embodiment, the phases of the electrostatic latent images for the first, second, and third colors are made different in such a manner that the phases of the parallel lines structures for the first, second, and third colors are shifted from each other by 30 μm.

A color image forming process according to the second preferred embodiment will now be described. In the color image forming apparatus according to the second preferred embodiment mentioned above, the formation of a color image is performed in the following manner. As shown in FIG. 2, the surface of the photosensitive drum 21 enough optically erased in electrostatic charge by the erase lamp 28 as required or the surface of the photosensitive drum 21 in its initial state is uniformly charged to −750 V, for example, by the scorotron charger 22. Of course, the charging potential and the charging polarity of the photosensitive drum 21 may be suitably changed according to a developing efficiency and other conditions. Then, the surface of the photosensitive drum 21 thus uniformly charged by the scorotron charger 22 is exposed to the laser beam 35 by the laser exposing unit 23 according to the exposure data 36 for the first color, thereby forming an electrostatic latent image for the first color on the photosensitive drum 21. The electrostatic latent image on the photosensitive drum 21 is formed by a screen having a parallel lines structure as similar to that in the first preferred embodiment. That is, according to the exposure data 36 "00 to FF" (corresponding to 0 to 255 steps of 8-bit resolution) generated by the screen generating circuit shown in FIG. 4, the semiconductor laser 31 connected to the laser control circuit 50 is turned on to erase the electrostatic charge at an exposed portion of the surface of the photosensitive drum 21, resulting in a potential contrast between the exposed portion and an unexposed portion of the surface of the photosensitive drum 21. The potential contrast formed on the photosensitive drum 21 causes the electrostatic latent image. The electrostatic latent image on the photosensitive drum 21 is formed by the parallel lines at a pitch of 200 lines/in, for example, and the potential of the electrostatic latent image except its edge is reduced to −150 V.

Then, the electrostatic latent image for the first color formed on the photosensitive drum 21 is reversely developed by the negatively charged yellow toner stored in the yellow color developing unit 24a for the first color or yellow. At this time, a DC voltage of −690 V superimposed with an AC voltage of 1.5 kV$_{p-p}$ having a frequency of 5 kHz is applied as a developing bias to the yellow color developing unit 24a. As a result, the yellow toner clings to the electrostatic latent image formed on the photosensitive drum 21 substantially along the shape of the parallel lines, thereby forming a yellow toner image on the photosensitive drum 21. In each of the color developing units 24a to 24d, toner particles each having a diameter of about 7 μm are employed to allow attachment of the toner faithful to the parallel lines.

Thereafter, an image forming step for the second color is performed. That is, the surface of the photosensitive drum 21 on which the yellow toner image has been formed is not subjected to transferring and cleaning steps, but is uniformly charged to −750 V again by the scorotron charger 22. Prior to this charging step, the surface of the photosensitive drum 21 may be erased in electrostatic charge by the static eraser 29 as a pretreatment for the second color image forming step.

Figure 11:
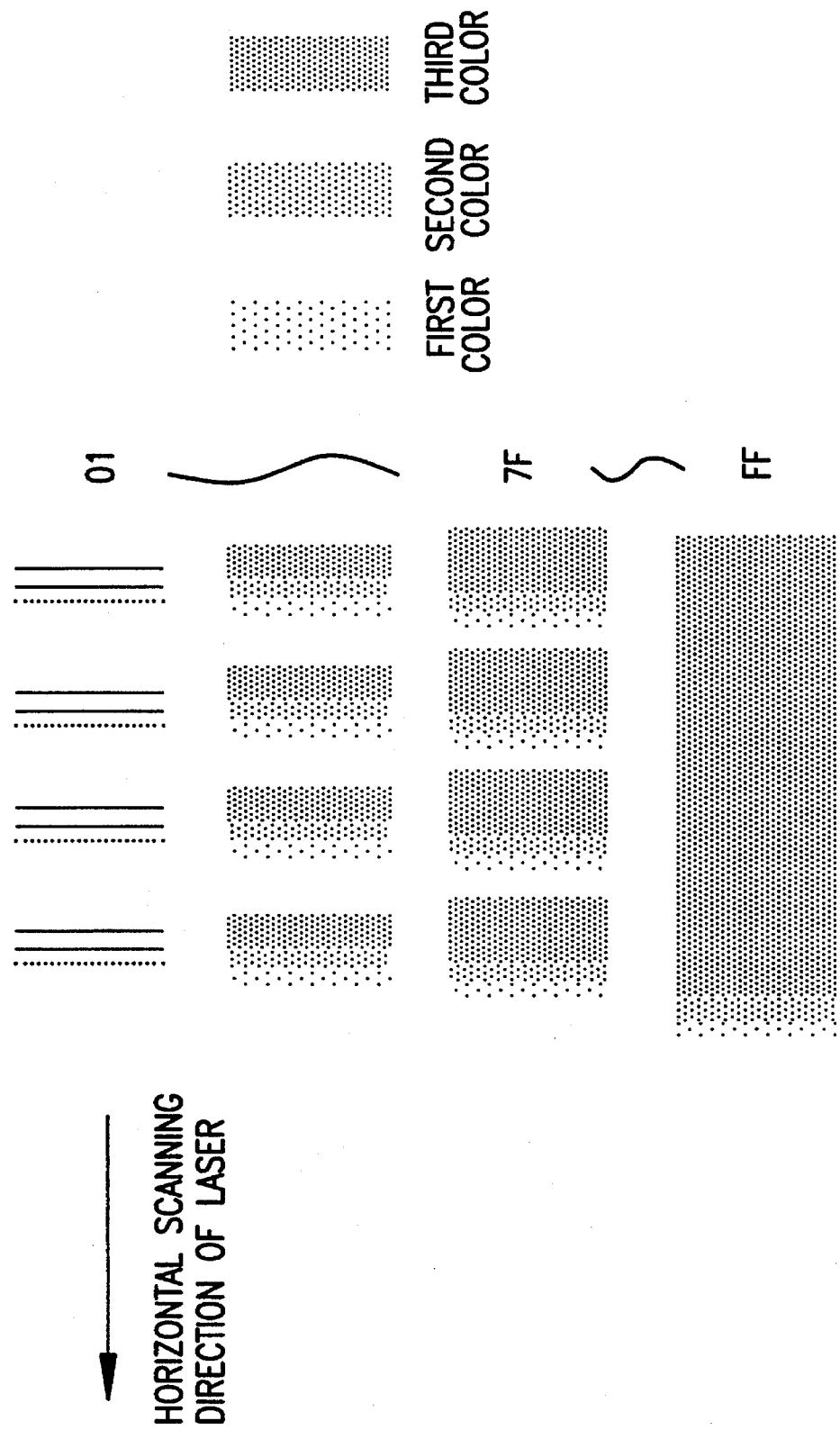
FIG. 11 is a view illustrating the parallel lines structures of electrostatic latent images for different colors according to a second preferred embodiment of the present invention.

Then, the surface of the photosensitive drum 21 is exposed to the laser beam 35 by the laser exposing unit 23 according to the image data 36 for the second color, thereby forming an electrostatic latent image for the second color. At this time, the center of each of the parallel lines forming the electrostatic latent image for the second color is shifted in phase by 30 μm from that of the parallel lines forming the electrostatic latent image for the first color to the upstream side in the horizontal scanning direction of the laser beam 35 as shown in FIG. 11. The potential of the electrostatic latent image for the second color except its edge is reduced to −170 V, for example, under the influence of the charging potential of the yellow toner image for the first color previously formed. Although the parallel lines forming the electrostatic latent image for the second color are formed on the upstream side of the parallel lines forming the electrostatic latent image for the first color in the horizontal scanning direction of the laser beam 35, the former may be formed on the downstream side of the latter in the horizontal scanning direction of the laser beam 35.

Then, the electrostatic latent image for the second color thus formed on the photosensitive drum 21 is developed by the magenta color developing unit 24b for the second color or magenta with the same developing parameters as those for the first color, thereby forming a magenta toner image on the photosensitive drum 21.

Thereafter, an image forming step for the third color is performed. That is, the surface of the photosensitive drum 21 on which the yellow toner image and the magenta toner image have been formed is uniformly charged again to −750 V by the scorotron charger 22. Prior to this charging, the surface of the photosensitive drum 21 may be erased in electrostatic charge by the static eraser 29 as a pretreatment for the third color image forming step. Then, the surface of the photosensitive drum 21 is exposed to the laser beam 35 by the laser exposing unit 23 according to the image data 36 for the third color, thereby forming an electrostatic latent image for the third color on the photosensitive drum 21. At this time, the phase of the parallel lines forming the electrostatic latent image for the third color is shifted from the phase of the parallel lines forming the electrostatic latent image for the first color by 60 μm to the upstream side in the horizontal scanning direction of the laser beam 35 as shown in FIG. 11. The potential of the electrostatic latent image for the third color except its edge is reduced to −190 V, for example, which is lower than the potential in the first preferred embodiment. Although the parallel lines for the third color are formed on the upstream side of the parallel lines for the first color and the second color in the horizontal scanning direction of the laser beam 35 in this preferred embodiment, the former may be formed on the downstream side of the latter in the horizontal scanning direction of the laser beam 35. Further, the parallel lines for the third color may be formed between the parallel lines for the first color and the parallel lines for the second color. In this case, the space between the parallel lines for the first color and the parallel lines for the second color is set large as required.

Then, the electrostatic latent image for the third color formed on the photosensitive drum 21 is developed by the cyan color developing unit 24c for the third color or cyan with the same developing parameters as those for the first color, thereby forming a cyan toner image on the photosensitive drum 21.

Figure 12:
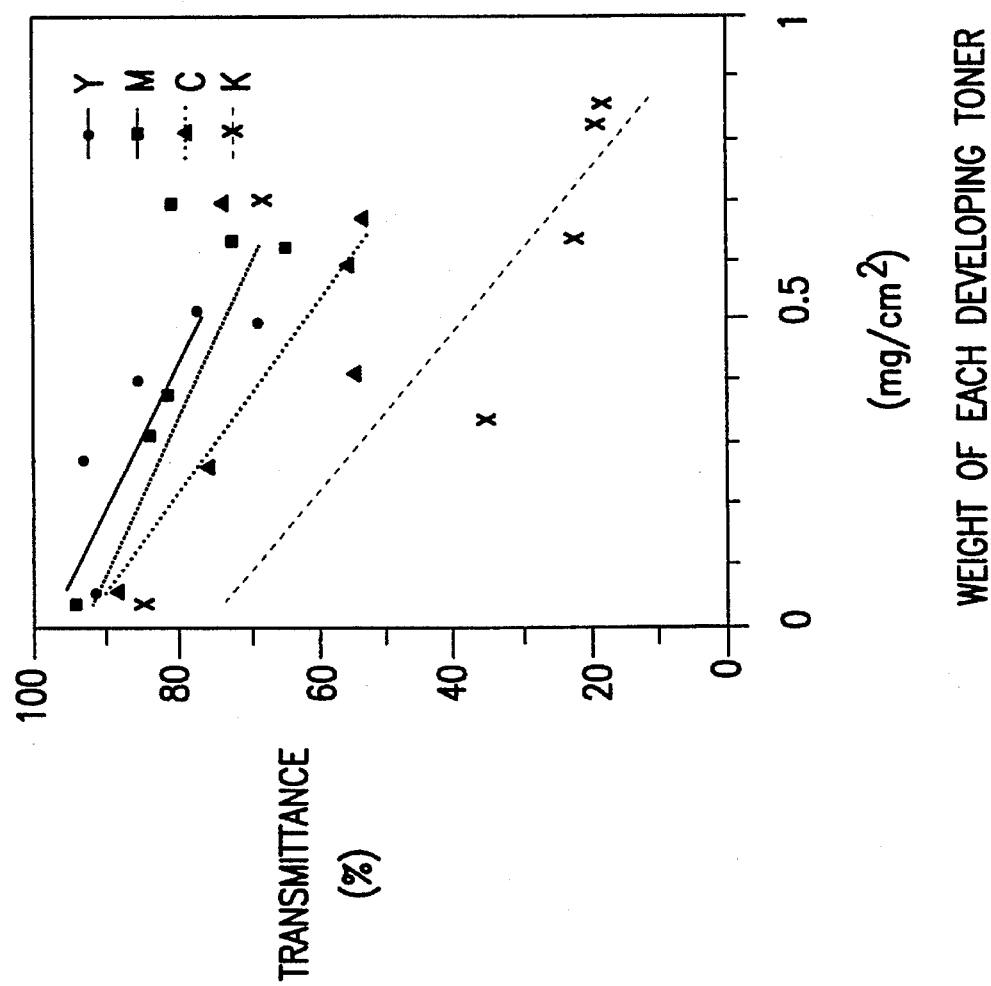
FIG. 12 is a graph showing the relation between the weight of each developing toner and the transmittance of light through a toner layer according to the second preferred embodiment.

Thereafter, an image forming step for the fourth color is performed. That is, the surface of the photosensitive drum 21 on which the yellow toner image, the magenta toner image, and the cyan toner image have been formed is uniformly charged again to −750 V by the scorotron charger 22. Prior to this charging, the surface of the photosensitive drum 21 may be erased in electrostatic charge by the static eraser 29 as a pretreatment for the fourth color image forming step. Then, the surface of the photosensitive drum 21 is exposed to the laser beam 35 by the laser exposing unit 23 according to the image data 36 for the fourth color, thereby forming an electrostatic latent image for the fourth color on the photosensitive drum 21. At this time, the phase of the parallel lines forming the electrostatic latent image for the fourth color is made identical with the phase of the parallel lines forming the electrostatic latent image for the first color. Alternatively, the phase of the parallel lines forming the electrostatic latent image for the fourth color may be made identical with the phase of the parallel lines forming the electrostatic latent image for the second color or the third color. Further, although the phase for the fourth color may be set to another phase other than those for the first, second, and third colors, it is preferably made identical with the phase for yellow or magenta. This is due to the fact that the yellow and magenta toners have a transmittance of the laser beam higher than that of the cyan toner as shown in FIG. 12, so that when the laser beam corresponding to the fourth color or black is directed to the surface of the photosensitive drum 21 from over the yellow or magenta toner image previously formed, the loss of the laser beam is made less. The potential of the electrostatic latent image for the fourth color except its edge is reduced to −230 V, for example.

Then, the electrostatic latent image for the fourth color formed on the photosensitive drum 21 is developed by the black color developing unit 24d for the fourth color or black with the same developing parameters as those for the first color, thereby forming a black toner image on the photosensitive drum 21.

Then, the toner images of the four colors thus formed on the photosensitive drum 21 are collectively transferred onto the recording paper 20 by the transfer charger 25 such as a transfer corotron, and the recording paper 20 onto which the toner images have been thus transferred is then separated from the photosensitive drum 21 to be fed to the fuser 26. The recording paper 20 is passed through the fuser 26 to thereby fix the toner images by heat and pressure, thus forming a color image on the recording paper 20.

Thereafter, the remaining toners and the hysteresis of charging on the photosensitive drum 21 are successively removed by the cleaner 27 and the erase lamp 28 to complete one cycle of the color image formation.

According to the second preferred embodiment, the phases of the electrostatic latent images for the first color, the second color, and the third color are made different from each other in such a manner that the phases of the parallel lines for the first color, the second color, and the third color are shifted from each other as shown in FIG. 11. Accordingly, the problem to be caused by the rise in toner potential and the dielectric property of the toner layers and the problem to be caused by the toner shielding effect both due to the formation of the plural toner images on the photosensitive drum 21 can be simultaneously solved in the following manner.

Figure 13A:
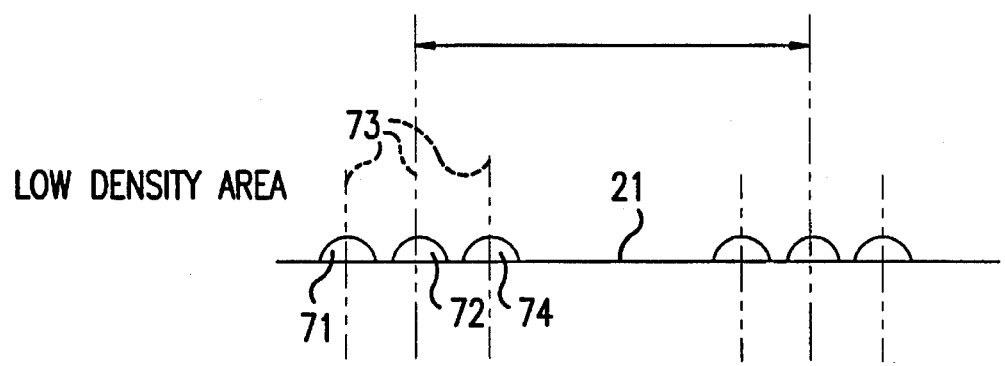
FIGS. 13A, 13B, and 13C are schematic cross sections of toner images formed on the photosensitive drum in different density areas according to the second preferred embodiment.
Figure 13B:
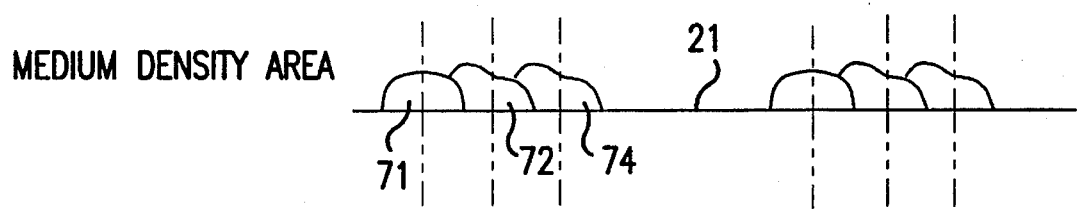
Figure 13C:
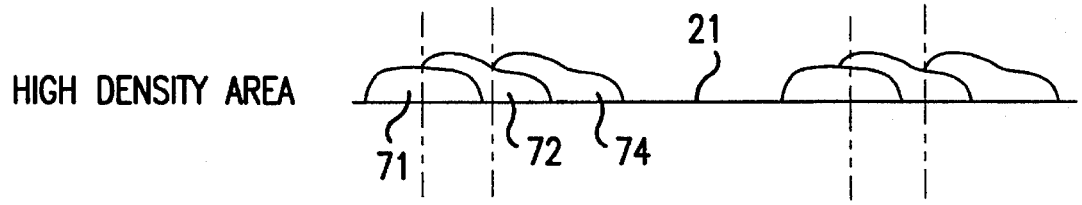

FIGS. 13A to 13C show the overlap of a yellow toner image 71, a magenta toner image 72, and a cyan toner image 74 formed on the photosensitive drum 21 in cross section. Reference numeral 73 denotes the center of the parallel lines structure forming the electrostatic latent image for each color. As shown in FIGS. 13A to 13C, the yellow toner image 71, the magenta toner image 72, and the cyan toner image 74 are less overlapped in a low density area where a toner density is low, i.e., in a highlight area (or there is also a lightest highlight area where all toner images 71, 72, and 74 are not overlapped as shown in FIG. 13A). In a medium density area and a high density area, the overlap of the yellow toner image 71, the magenta toner image 72, and the cyan toner image 74 becomes more. That is, the higher the toner density, the more the overlap of all toner images 71, 72, and 74.

Figure 14:
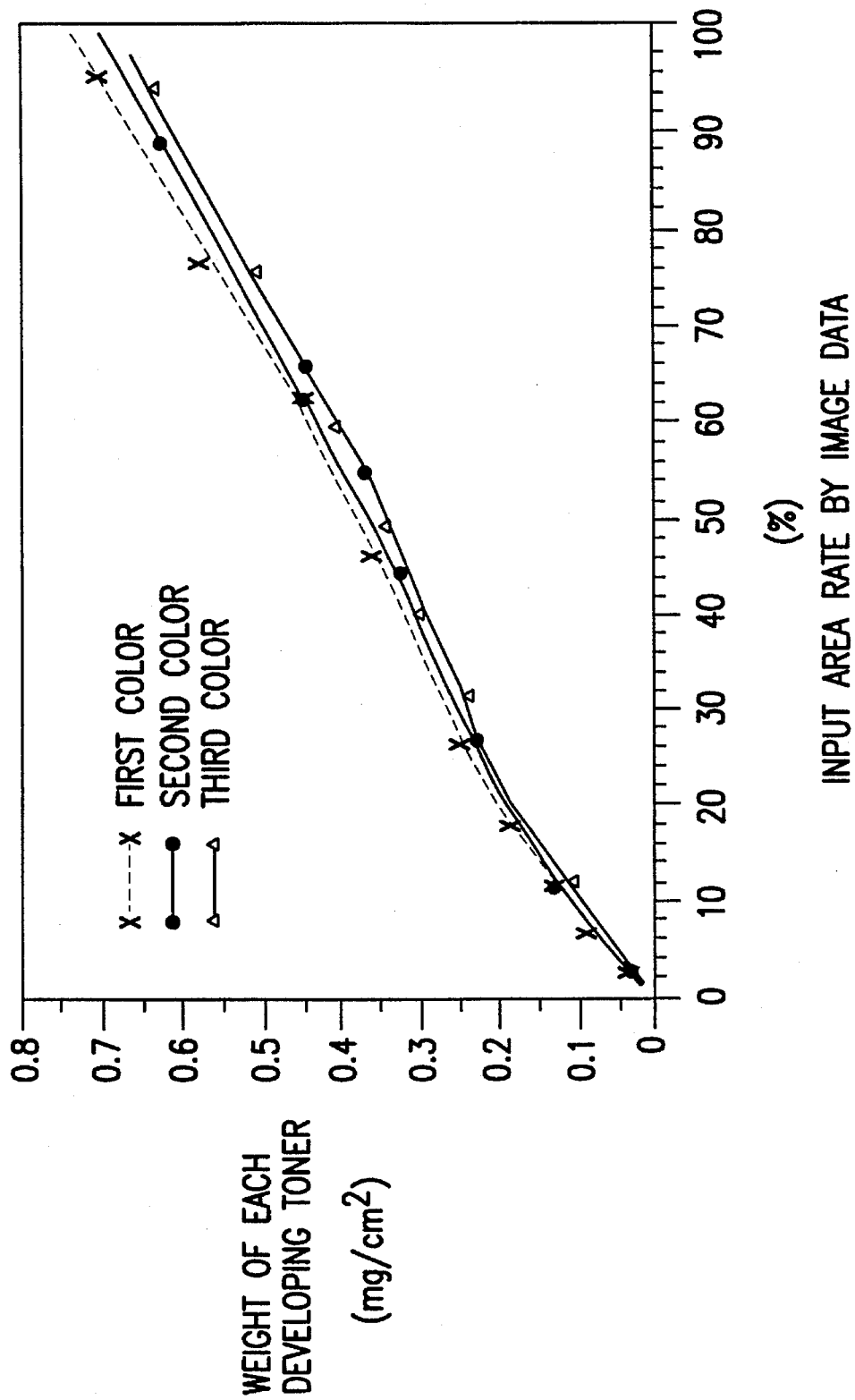
FIG. 14 is a graph showing the relation between the input area rate by image data and the weight of each developing toner according to the second preferred embodiment.

The heights of the toner images 71, 72, and 74 are different depending on the density areas. In comparison with the related art wherein registered toner images (yellow toner image+magenta toner image+cyan toner image) are formed by registering dots to form registered electrostatic latent images for the three colors, the total height of the toner images formed by shifting the phases of the parallel lines for the second color and the third color according to the second preferred embodiment is greatly smaller, and the larger the weight of the developing toners, the more remarkable the above tendency. Further, the potential of the toner layers according to the second preferred embodiment is lower than that in the related art at the same weight of the developing toners. Accordingly, the influence of the potential of the toner layers previously formed can be reduced in developing the electrostatic latent image for the third color or the fourth color, thereby allowing the same weight of the developing toner for development of the electrostatic latent image for the third color or the fourth color as that for the first color or the second color. Further, as shown in FIG. 13A, the toner images are less overlapped in the highlight area where the weight of the developing toners is small. Accordingly, the dielectric influence due to the height (thickness) of the toner images can be eliminated. In addition, the influence due to the overlap of the yellow toner image 71 and the magenta toner image 72 is less than that in the first preferred embodiment in performing the exposure for the third color or cyan. Accordingly, loss such as transmission through the toner layers and scattering at the interface can be reduced. FIG. 14 shows a difference in development characteristics of the parallel lines between the first, second, and third colors according to the second preferred embodiment. As apparent from FIG. 14, the development characteristics for the second and third colors can be made more substantially identical with those for the first color as compared with the first preferred embodiment. Thus, the effect of improvement according to the second preferred embodiment is greater than that according to the first preferred embodiment.

The other constitution and operation in the second preferred embodiment are similar to those in the first preferred embodiment, and the explanation thereof will accordingly be omitted herein.

Third Preferred Embodiment

A third preferred embodiment of the color image forming apparatus according to the present invention will now be described with reference to the drawings, in which the same parts as those in the first preferred embodiment are denoted by the same reference numerals. Also in the third preferred embodiment, the color image forming apparatus shown in

FIG. 2 is used.

In the case where the phases of the electrostatic latent images for the first color and the second color are shifted from each other as in the first preferred embodiment, or in the case where the phases of the electrostatic latent images for the first color, the second color, and the third color are shifted from each other as in the second preferred embodiment, there is a possibility that excess shift in the phase between any two colors such as between the first color and the second color may cause a deterioration in image quality of a color image to be printed because of mixing of the plural colors. In view of this point, the third preferred embodiment is intended to clarify the relation between the number of screen lines allowable in respect of the image quality of the color image and the maximum phase shift between two colors.

Actually, a test of forming color images was made by changing the number of screen lines N (lines/in) and the maximum phase shift between two colors $\Delta x$ (m). The test result is shown in FIG. 15, in which a hatched area indicates a visual allowable range of color shift.

Figure 15:
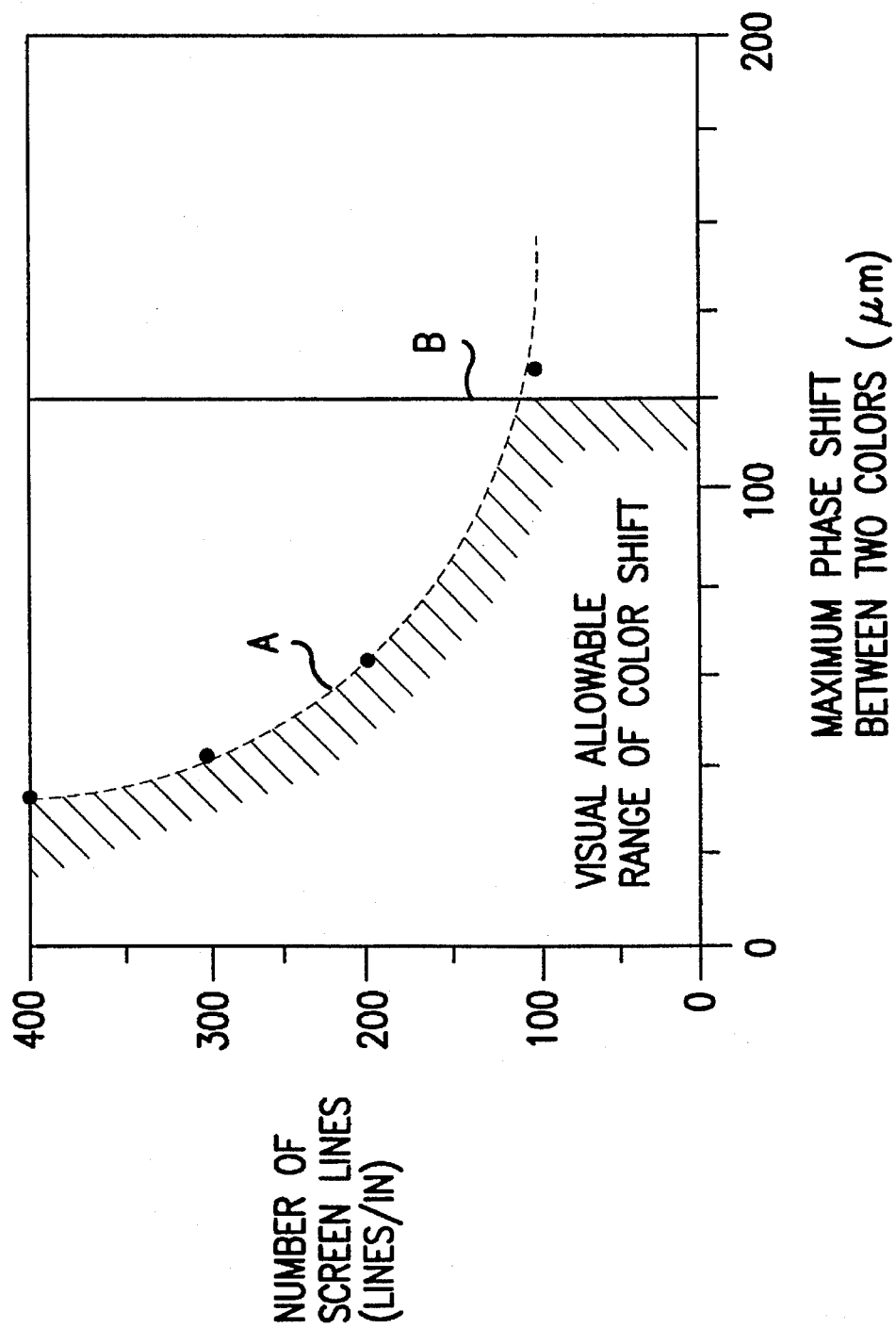
FIG. 15 is a graph showing the relation between the maximum phase shift between two colors and the number of screen lines according to a third preferred embodiment of the present invention.

As apparent from FIG. 15, a curve A deciding a boundary of the visual allowable range of color shift shows a substantially inversely proportional relation between the number of screen lines N (lines/in) and the maximum phase shift between two colors $\Delta x$ (m). The curve A is expressed as $N \times \Delta x = 0.012$. Further, a curve B also deciding the boundary of the visual allowable range of color shift is a straight line corresponding to the maximum phase shift between two colors $\Delta x$ equal to 0.00012 (m). Accordingly, the area bounded by the curve A and the curve B indicates the visual allowable range of color shift. In other words, the visual allowable range of color shift is defined so as to satisfy the conditions that the product of the number of screen lines N (lines/in) and the maximum phase shift between two colors $\Delta x$ (m) is not greater than 0.012 and that the maximum phase shift between two colors $\Delta x$ (m) is not greater than 0.00012 (m). If the above conditions are not satisfied, color nonuniformity appears in the color image. In addition, there occurs a problem in hue change due to a change in degree of the overlap of the toner images (concretely, discontinuous points in hue change start appearing), causing a defect such as a false outline.

The other constitution and operation in the third preferred embodiment are similar to those in the first preferred embodiment, and the explanation thereof will accordingly be omitted herein.

Fourth Preferred Embodiment

A fourth preferred embodiment of the color image forming apparatus according to the present invention will now be described with reference to the drawings, in which the same parts as those in the first preferred embodiment are denoted by the same reference numerals. Also in the fourth preferred embodiment, the color image forming apparatus shown in FIG. 2 is used.

Figure 16:
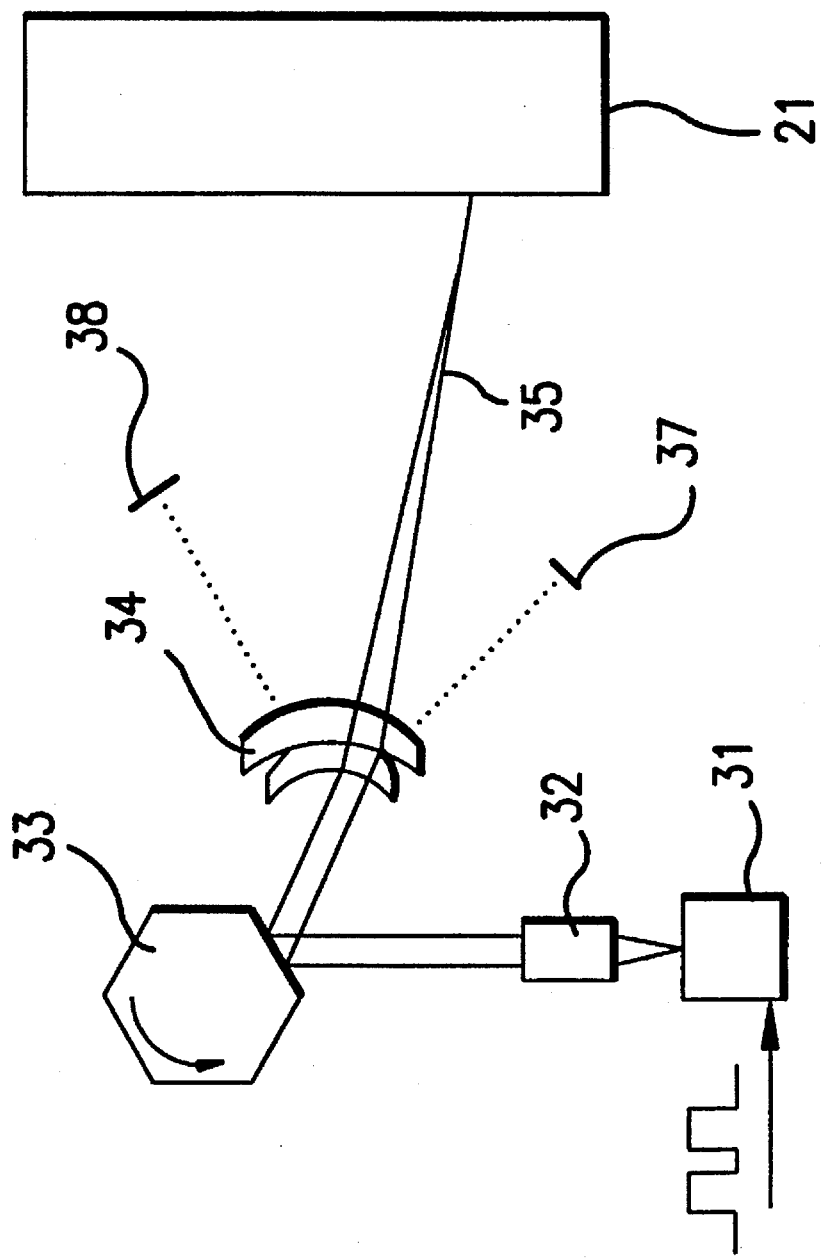
FIG. 16 is a schematic view illustrating the structure of a laser exposing unit according to a fourth preferred embodiment of the present invention.

In the fourth preferred embodiment, the laser exposing unit 23 is provided with a scan start detecting device 37 for detecting a start timing of scanning of the laser beam 35 and a scan end detecting device 38 for detecting an end timing of scanning of the laser beam 35 as shown in FIG. 16. Although both the scan start detecting device 37 and the scan end detecting device 38 are provided, either the scan start detecting device 37 or the scan end detecting device 38 may be provided.

Figure 17:
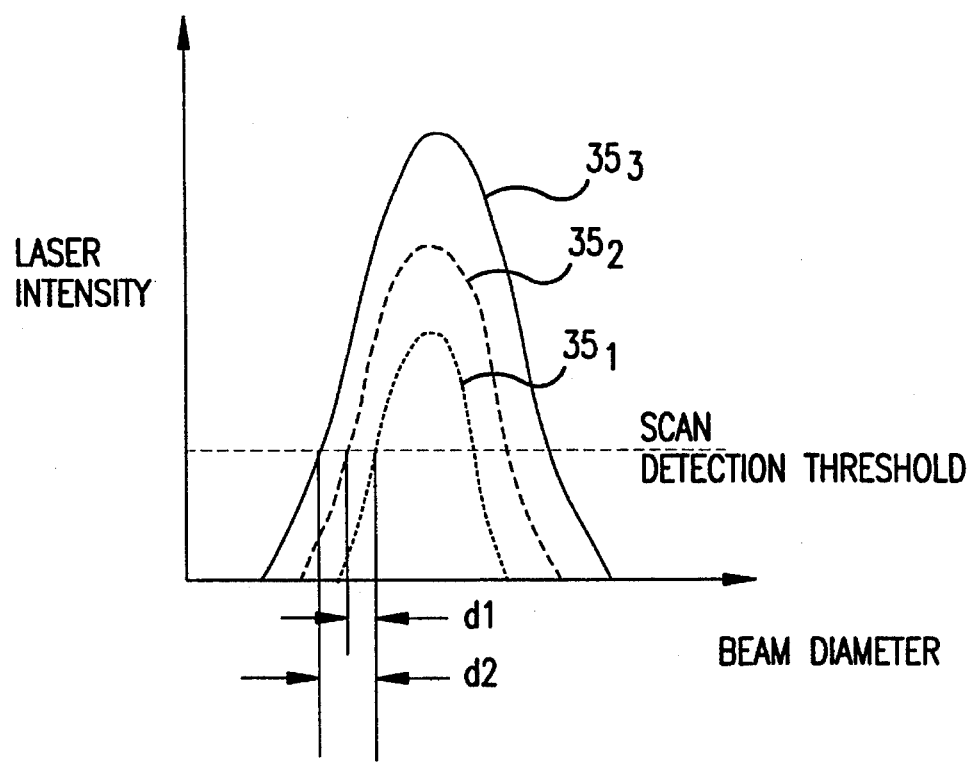
FIG. 17 is a graph showing different intensities of a laser beam according to the fourth preferred embodiment.
Figure 18:
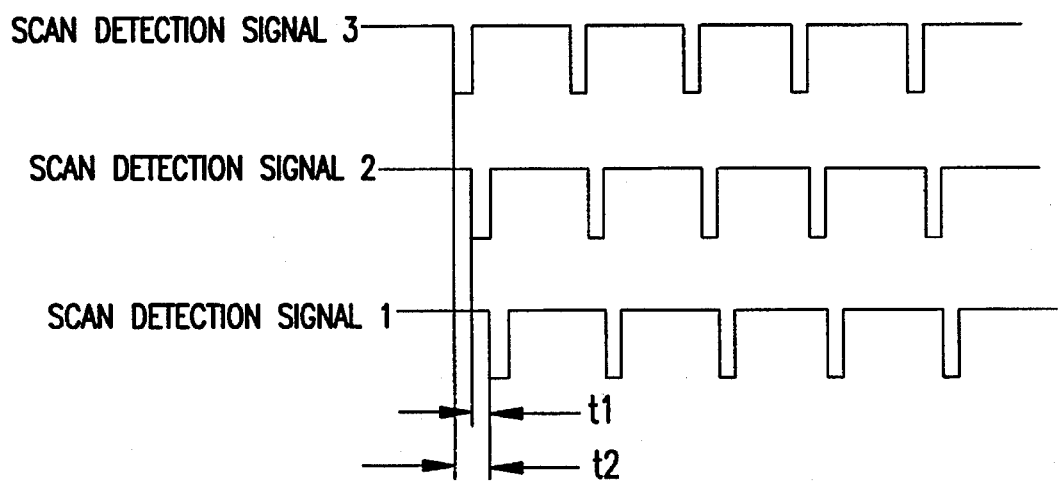
FIG. 18 is a time chart showing different detection timings of the laser beam according to the fourth preferred embodiment.

As shown in FIG. 16, the scan start detecting device 37 or the scan end detecting device 38 detects at a scan start position or a scan end position the laser beam 35 deflected by the polygonal mirror 33 to scan the photosensitive drum 21 along the axis of rotation thereof, converts the intensity of the laser beam 35 into an electrical signal, and outputs a scan reference signal when the intensity of the laser beam 35 exceeds a given threshold, thereby detecting the scan start timing or the scan end timing of the laser beam 35. In this preferred embodiment, the phase of the parallel lines for each scan line and each color is decided according to the scan reference signal. Further, as shown in FIG. 17, the intensities of laser beams $35_1$, $35_2$, and $35_3$ for forming the electrostatic latent images for the first color, the second color, and the third color, respectively, are set to be stepwise increased in this order. In other words, as shown in FIG. 17, the intensity of the laser beam $35_1$ for the first color is the lowest, and the detection timing of the laser beam $35_1$ by the scan start detecting device 37 or the scan end detecting device 38 is the latest. The intensity of the laser beam $35_2$ for the second color is higher than that of the laser beam $35_1$ for the first color, and the detection timing of the laser beam $35_2$ by the scan start detecting device 37 or the scan end detecting device 38 is earlier by a given time than that of the laser beam $35_1$ for the first color. The intensity of the laser beam 353 for the third color is the highest, and the detection timing of the laser beam 353 by the scan start detecting device 37 or the scan end detecting device 38 is earlier by a given time than that of the laser beam $35_2$ for the second color. Accordingly, as shown in FIG. 18, the phase of the electrostatic latent image to be formed by the laser beam $35_3$ for the third color is set the earliest; the phase of the electrostatic latent image to be formed by the laser beam $35_2$ for the second color is set later by a given time t1 than that by the laser beam $35_3$ for the third color; and the phase of the electrostatic latent image to be formed by the laser beam $35_1$ for the first color is set later by a given time t2 than that by the laser beam $35_3$ for the third color. As a result, the phases of the parallel lines for the first color, the second color, and the third color are shifted from each other in this order to the upstream side in the horizontal scanning direction of the laser beam 35.

A color image forming process according to the fourth preferred embodiment will now be described. In the color image forming apparatus according to the fourth preferred embodiment mentioned above, the formation of a color image is performed in the following manner. As shown in FIG. 2, the surface of the photosensitive drum 21 enough optically erased in electrostatic charge by the erase lamp 28 as required or the surface of the photosensitive drum 21 in its initial state is uniformly charged to −750 V, for example, by the scorotron charger 22. Of course, the charging potential and the charging polarity of the photosensitive drum 21 may be suitably changed according to a developing efficiency and other conditions. Then, the surface of the photosensitive drum 21 thus uniformly charged by the scorotron charger 22 is exposed to the laser beam 35 by the laser exposing unit 23 according to the exposure data 36 for the first color, thereby forming an electrostatic latent image for the first color on the photosensitive drum 21. The electrostatic latent image on the photosensitive drum 21 is formed by a screen having a parallel lines structure as similar to that in the first preferred embodiment. That is, according to the exposure data 36 "00 to FF" (corresponding to 0 to 255 steps of 8-bit resolution) generated by the screen generating circuit shown in FIG. 4, the semiconductor laser 31 connected to the laser control circuit 50 is turned on to erase the electrostatic charge at an exposed portion of the surface of the photosensitive drum 21, resulting in a potential contrast between the exposed portion and an unexposed portion of the surface of the photosensitive drum 21. The potential contrast formed on the photosensitive drum 21 causes the electrostatic latent image. The electrostatic latent image on the photosensitive drum 21 is formed by the parallel lines at a pitch of 200 lines/in, for example, and the potential of the electrostatic latent image except its edge is reduced to −150 V. At this time, the intensity of the laser beam 35 for forming the electrostatic latent image for the first color is set to 0.6 mW, for example, on the photosensitive drum 21.

Then, the electrostatic latent image for the first color formed on the photosensitive drum 21 is reversely developed by the negatively charged yellow toner stored in the yellow color developing unit 24a for the first color or yellow. At this time, a DC voltage of −690 V superimposed with an AC voltage of 1.5 kV$_{p-p}$ having a frequency of 5 kHz is applied as a developing bias to the yellow color developing unit 24a. As a result, the yellow toner clings to the electrostatic latent image formed on the photosensitive drum 21 substantially along the shape of the parallel lines, thereby forming a yellow toner image on the photosensitive drum 21. In each of the color developing units 24a to 24d, toner particles each having a diameter of about 7 μm are employed to allow attachment of the toner faithful to the parallel lines.

Thereafter, an image forming step for the second color is performed. That is, the surface of the photosensitive drum 21 on which the yellow toner image has been formed is not subjected to transferring and cleaning steps, but is uniformly charged to −750 V again by the scorotron charger 22. Prior to this charging step, the surface of the photosensitive drum 21 may be erased in electrostatic charge by the static eraser 29 as a pretreatment for the second color image forming step.

Then, the surface of the photosensitive drum 21 is exposed to the laser beam 35 by the laser exposing unit 23 according to the image data 36 for the second color, thereby forming an electrostatic latent image for the second color. At this time, the intensity of the laser beam 35 for forming the electrostatic latent image for the second color is set to 1.0 mW higher than that for the first color. As a result, as shown in FIG. 18, a scan detection signal 2 of the laser beam 35 for the second color is detected earlier by a given time t1 (e.g., 30 nanoseconds) than a scan detection signal 1 of the laser beam 35 for the first color, and the center of each of the parallel lines forming the electrostatic latent image for the second color is shifted in phase by 30 μm from that of the parallel lines forming the electrostatic latent image for the first color to the upstream side in the horizontal scanning direction of the laser beam 35 as shown in FIG. 11. The potential of the electrostatic latent image for the second color except its edge is reduced to −160 V, for example, under the influence of the charging potential of the yellow toner image for the first color previously formed.

Then, the electrostatic latent image for the second color thus formed on the photosensitive drum 21 is developed by the magenta color developing unit 24b for the second color or magenta with the same developing parameters as those for the first color, thereby forming a magenta toner image on the photosensitive drum 21.

Thereafter, an image forming step for the third color is performed. That is, the surface of the photosensitive drum 21 on which the yellow toner image and the magenta toner image have been formed is uniformly charged again to −750 V by the scorotron charger 22. Prior to this charging, the surface of the photosensitive drum 21 may be erased in electrostatic charge by the static eraser 29 as a pretreatment for the third color image forming step. Then, the surface of the photosensitive drum 21 is exposed to the laser beam 35 by the laser exposing unit 23 according to the image data 36 for the third color, thereby forming an electrostatic latent image for the third color on the photosensitive drum 21. At this time, the intensity of the laser beam 35 is set to 1.5 mW higher than that for the second color. As a result, as shown in FIG. 18, a scan detection signal 3 of the laser beam 35 for the third color is detected earlier by a given time t2 (e.g., 60 nanoseconds) than the scan detection signal 1 of the laser beam 35 for the first color, and the phase of the parallel lines forming the electrostatic latent image for the third color is shifted from the phase of the parallel lines forming the electrostatic latent image for the first color by 60 μm to the upstream side in the horizontal scanning direction of the laser beam 35 as shown in FIG. 11. The potential of the electrostatic latent image for the third color except its edge is reduced to −175 V, for example, under the influence of the charging potential of the toner image for the first color. Then, the electrostatic latent image for the third color formed on the photosensitive drum 21 is developed by the cyan color developing unit 24c for the third color or cyan with the same developing parameters as those for the first color, thereby forming a cyan toner image on the photosensitive drum 21.

Thereafter, similar image forming steps including development of other different colors may be repeated as required.

Then, the toner images of the three colors thus formed on the photosensitive drum 21 are collectively transferred onto the recording paper 20 by the transfer charger 25 such as a transfer corotron, and the recording paper 20 onto which the toner images have been thus transferred is then separated from the photosensitive drum 21 to be fed to the fuser 26. The recording paper 20 is passed through the fuser 26 to thereby fix the toner images by heat and pressure, thus forming a color image on the recording paper 20.

Thereafter, the remaining toners and the hysteresis of charging on the photosensitive drum 21 are successively removed by the cleaner 27 and the erase lamp 28 to complete one cycle of the color image formation.

According to the fourth preferred embodiment, the intensity of the laser beam 35 is changed with each color to thereby make different the phases of the electrostatic latent images for the first color, the second color, and the third color in such a manner as to shift the phases of the parallel lines structures for the first to third colors. Accordingly, the overlap of the toner images formed on the photosensitive drum 21 can be made substantially the same as that shown in FIG. 13A to 13C.

Thus, the phases of the parallel lines are shifted from each other by changing the intensity of the laser beam 35 with each color in this preferred embodiment. Accordingly, a color image recording apparatus having a high image quality can be realized with a simple constitution at a low cost. Further, according to this preferred embodiment wherein the intensity of the laser beam 35 is stepwise increased with a change in color, the loss such as transmission through the toner layers and light scattering at the interface can be compensated. Accordingly, the rise in exposure potential due to the charges of the toner layers, the dielectric property of the toner layers, and the toner shielding effect can be totally solved more effectively to thereby effect faithful reproduction of the highlight area important for a good halftone image, especially a high-quality color image with the result that a defect such as a false outline does not occur to obtain stable tone reproduction.

While the change in intensity of the laser beam entering the scan detecting device causes a difference in maximum density and tone of each component color, the following advantages can be obtained according to this preferred embodiment. That is, a good gray balance in a color imposed portion can be obtained; a color reproduction area (Gamut) can be enough secured; and a difference in density in the vicinity of a maximum density is hardly visually perceived. Thus, this preferred embodiment is greatly effective as a whole.

Figure 19:
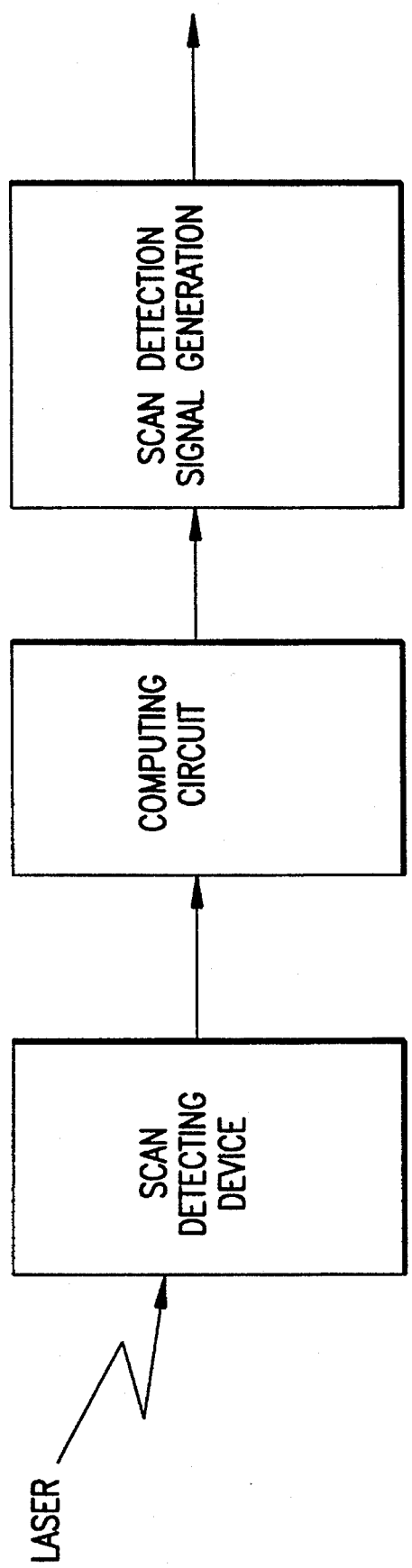
FIG. 19 is a block diagram of a timing control circuit for controlling exposure timings of the laser beam, showing a modification of the fourth preferred embodiment.

Although the phase of the parallel lines structure for each color is changed according to a difference in intensity of the laser beam entering the scan detecting device in this preferred embodiment, a scan detection signal may be generated according to an algorithm as shown in FIG. 19 to thereby shift the phase for each color.

Further, although the phase of the parallel lines structure is changed according to the scan detection signal in this preferred embodiment, the phase of the parallel lines structure may be changed by delaying an internal clock generated in the laser exposing unit.

The other constitution and operation in the fourth preferred embodiment are similar to those in the first preferred embodiment, and the explanation thereof will accordingly be omitted herein.

Fifth Preferred Embodiment

A fifth preferred embodiment of the color image forming apparatus according to the present invention will now be described with reference to the drawings, in which the same parts as those in the first preferred embodiment are denoted by the same reference numerals. Also in the fifth preferred embodiment, the color image forming apparatus shown in FIG. 2 is used.

Figure 20:
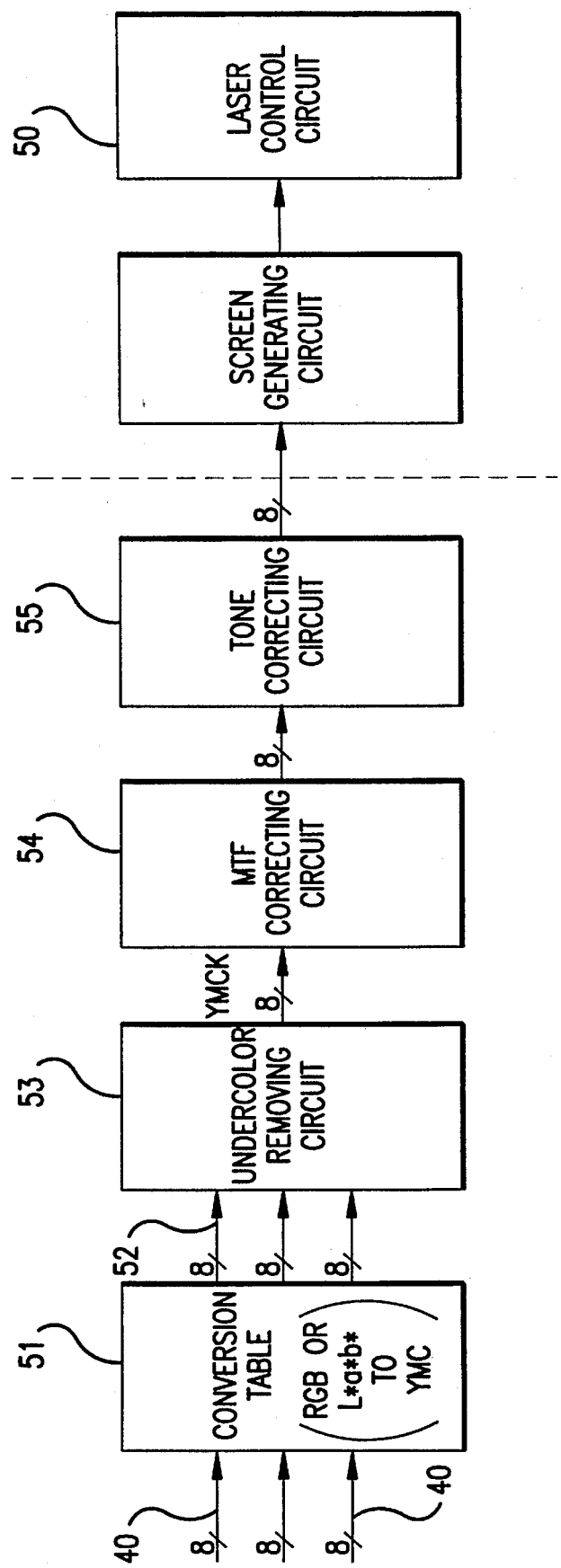
FIG. 20 is a block diagram of an image processing device according to a fifth preferred embodiment.

In the fifth preferred embodiment, an image processing device for performing tone correction processing and the like to input image data is provided. As shown in FIG. 20, the image processing device receives image data 40 having tone information for each picture element to be printed, from an image reading device, a host computer, etc. not shown. The image data 40 are input as 8-bit tone information of R, G, B or L*, a*, b*. Then, these image data 40 are converted into image data 52 of Y, M, C by a conversion table 51. This conversion may be performed by using a conversion matrix rather than by using the conversion table 51. Then, these image data 52 are converted into image data of Y, M, C, K by an undercolor removing circuit 53. Then, these image data are applied to an MTF correcting circuit 54 through a tone correcting circuit 55 to a screen generating circuit. The tone correcting circuit 55 functions to perform given tone correction to the image data for the first color, the second color, and the third color.

A color image forming process according to the fifth preferred embodiment will now be described. In the color image forming apparatus according to the fifth preferred embodiment mentioned above, the formation of a color image is performed in the following manner. As shown in FIG. 2, the surface of the photosensitive drum 21 enough optically erased in electrostatic charge by the erase lamp 28 as required or the surface of the photosensitive drum 21 in its initial state is uniformly charged to −750 V, for example, by the scorotron charger 22. Of course, the charging potential and the charging polarity of the photosensitive drum 21 may be suitably changed according to a developing efficiency and other conditions. Then, the surface of the photosensitive drum 21 thus uniformly charged by the scorotron charger 22 is exposed to the laser beam 35 by the laser exposing unit 23 according to the exposure data 36 for the first color, thereby forming an electrostatic latent image for the first color on the photosensitive drum 21. The electrostatic latent image on the photosensitive drum 21 is formed by a screen having a parallel lines structure as similar to that in the first preferred embodiment. That is, according to the exposure data 36 "00 to FF" (corresponding to 0 to 255 steps of 8-bit resolution) generated by the screen generating circuit shown in FIG. 4, the semiconductor laser 31 connected to the laser control circuit 50 is turned on to erase the electrostatic charge at an exposed portion of the surface of the photosensitive drum 21, resulting in a potential contrast between the exposed portion and an unexposed portion of the surface of the photosensitive drum 21. The potential contrast formed on the photosensitive drum 21 causes the electrostatic latent image. The electrostatic latent image on the photosensitive drum 21 is formed by the parallel lines at a pitch of 200 lines/in, for example, and the potential of the electrostatic latent image except its edge is reduced to −150 V.

Then, the electrostatic latent image for the first color formed on the photosensitive drum 21 is reversely developed by the negatively charged yellow toner stored in the yellow color developing unit 24a for the first color or yellow. At this time, a DC voltage of −690 V superimposed with an AC voltage of 1.5 kV$_{p-p}$ having a frequency of 5 kHz is applied as a developing bias to the yellow color developing unit 24a. As a result, the yellow toner clings to the electrostatic latent image formed on the photosensitive drum 21 substantially along the shape of the parallel lines, thereby forming a yellow toner image on the photosensitive drum 21. In each of the color developing units 24a to 24d, toner particles each having a diameter of about 7 μm are employed to allow attachment of the toner faithful to the parallel lines.

Thereafter, an image forming step for the second color is performed. That is, the surface of the photosensitive drum 21 on which the yellow toner image has been formed is not subjected to transferring and cleaning steps, but is uniformly charged to −750 V again by the scorotron charger 22. Prior to this charging step, the surface of the photosensitive drum 21 may be erased in electrostatic charge by the static eraser 29 as a pretreatment for the second color image forming step.

Figure 21:
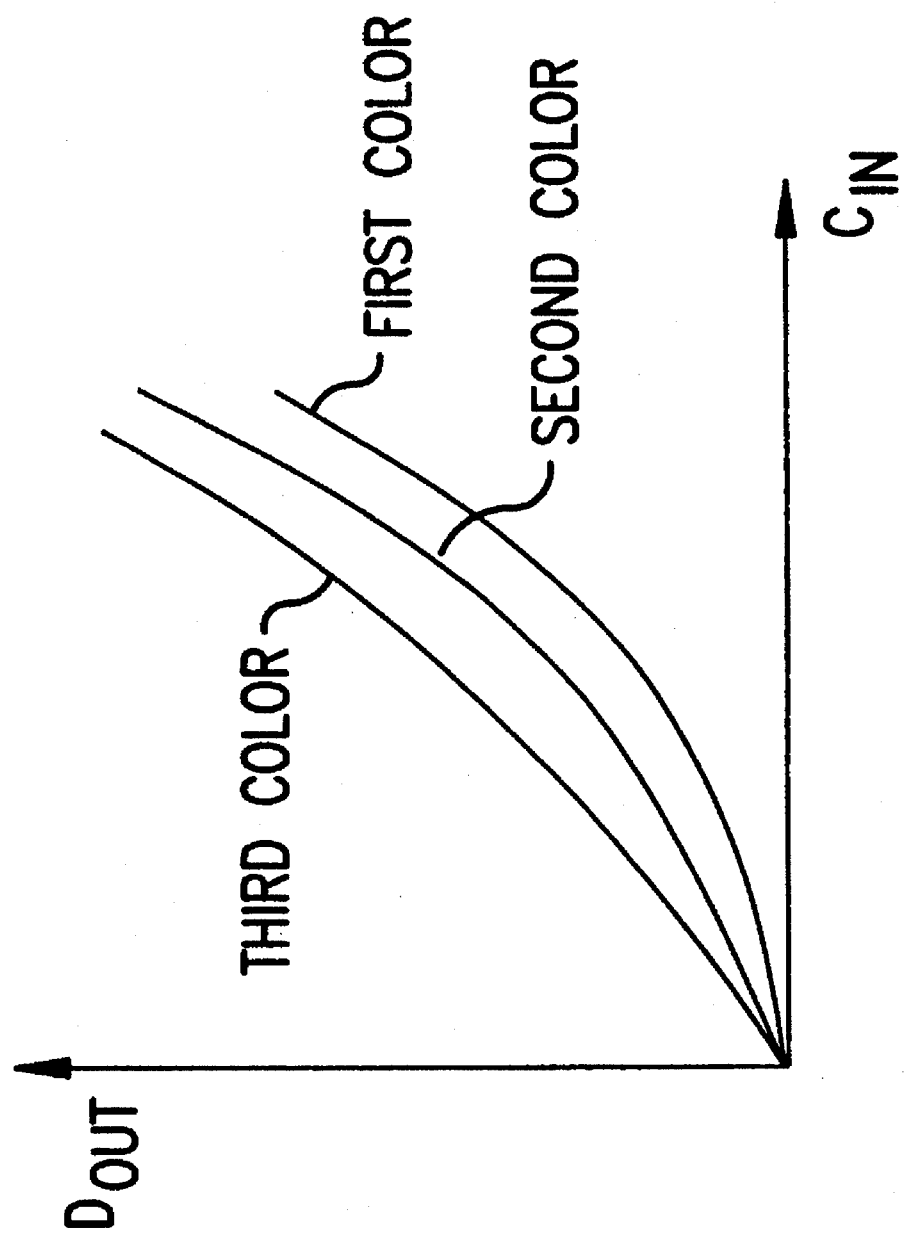
FIG. 21 is a graph showing tone correction data for different colors according to the fourth preferred embodiment.

Then, the surface of the photosensitive drum 21 is exposed to the laser beam 35 by the laser exposing unit 23 according to the image data 36 for the second color, thereby forming an electrostatic latent image for the second color. At this time, the center of each of the parallel lines forming the electrostatic latent image for the second color is shifted in phase by 30 μm from that of the parallel lines forming the electrostatic latent image for the first color to the upstream side in the horizontal scanning direction of the laser beam 35 as shown in FIG. 11. Further, as shown in FIG. 21, in forming the electrostatic latent image for the second color, the tone information of the image data for the second color is varied so that the electrostatic latent image for the second color is emphasized more than that for the first color by the tone correcting circuit 55 shown in FIG. 20. The potential of the electrostatic latent image for the second color except its edge is reduced to −165 V, for example, under the influence of the charging potential of the yellow toner image for the first color previously formed. Although the parallel lines forming the electrostatic latent image for the second color are formed on the upstream side of the parallel lines forming the electrostatic latent image for the first color in the horizontal scanning direction of the laser beam 35, the former may be formed on the downstream side of the latter in the horizontal scanning direction of the laser beam 35.

Then, the electrostatic latent image for the second color thus formed on the photosensitive drum 21 is developed by the magenta color developing unit 24b for the second color or magenta with the same developing parameters as those for the first color, thereby forming a magenta toner image on the photosensitive drum 21.

Thereafter, an image forming step for the third color is performed. That is, the surface of the photosensitive drum 21 on which the yellow toner image and the magenta toner image have been formed is uniformly charged again to −750 V by the scorotron charger 22. Prior to this charging, the surface of the photosensitive drum 21 may be erased in electrostatic charge by the static eraser 29 as a pretreatment for the third color image forming step. Then, the surface of the photosensitive drum 21 is exposed to the laser beam 35 by the laser exposing unit 23 according to the image data 36 for the third color, thereby forming an electrostatic latent image for the third color on the photosensitive drum 21. At this time, the phase of the parallel lines forming the electrostatic latent image for the third color is shifted from the phase of the parallel lines forming the electrostatic latent image for the first color by 60 μm to the upstream side in the horizontal scanning direction of the laser beam 35 as shown in FIG. 11. Further, as shown in FIG. 21, in forming the electrostatic latent image for the third color, the tone information of the image data for the third color is varied so that the electrostatic latent image for the third color is emphasized more than that for the second color. The potential of the electrostatic latent image for the third color except its edge is reduced to −180 V, for example, under the influence of the charging potential of the toner image for the first color. Although the parallel lines for the third color are formed on the upstream side of the parallel lines for the first color and the second color in the horizontal scanning direction of the laser beam 35 in this preferred embodiment, the former may be formed on the downstream side of the latter in the horizontal scanning direction of the laser beam 35. Further, the parallel lines for the third color may be formed between the parallel lines for the first color and the parallel lines for the second color. Then, the electrostatic latent image for the third color formed on the photosensitive drum 21 is developed by the cyan color developing unit 24c for the third color or cyan with the same developing parameters as those for the first color, thereby forming a cyan toner image on the photosensitive drum 21.

Thereafter, similar image forming steps including development of other different colors may be repeated as required.

Then, the toner images of the three colors thus formed on the photosensitive drum 21 are collectively transferred onto the recording paper 20 by the transfer charger 25 such as a transfer corotron, and the recording paper 20 onto which the toner images have been thus transferred is then separated from the photosensitive drum 21 to be fed to the fuser 26. The recording paper 20 is passed through the fuser 26 to thereby fix the toner images by heat and pressure, thus forming a color image on the recording paper 20.

Thereafter, the remaining toners and the hysteresis of charging on the photosensitive drum 21 are successively removed by the cleaner 27 and the erase lamp 28 to complete one cycle of the color image formation.

According to the fifth preferred embodiment, the rise in exposure potential due to the charges of the toner layers, the dielectric property of the toner layers, and the toner shielding effect can be totally solved to thereby effect faithful reproduction of the highlight area important for a good halftone image, especially a high-quality color image with the result that a defect such as a false outline does not occur to obtain stable tone reproduction.

While the change in tone of the image data causes a difference in maximum density and tone of each component color, the following advantages can be obtained according to this preferred embodiment. That is, a good gray balance in a color imposed portion can be obtained; a color reproduction area (Gamut) can be enough secured; and a difference in density in the vicinity of a maximum density is hardly visually perceived. Thus, this preferred embodiment is greatly effective as a whole.

The other constitution and operation in the fifth preferred embodiment are similar to those in the first preferred embodiment, and the explanation thereof will accordingly be omitted herein.

Sixth Preferred Embodiment

A sixth preferred embodiment of the color image forming apparatus according to the present invention will now be described with reference to the drawings, in which the same parts as those in the first preferred embodiment are denoted by the same reference numerals. Also in the sixth preferred embodiment, the color image forming apparatus shown in FIG. 2 is used.

In the sixth preferred embodiment, an image processing device for performing tone correction processing and the like to input image data is provided. As shown in FIG. 20, the image processing device receives image data 40 having tone information for each picture element to be printed, from an image reading device, a host computer, etc. not shown. The image data 40 are input as 8-bit tone information of R, G, B or L*, a*, b*. Then, these image data 40 are converted into image data 52 of Y, M, C by a conversion table 51. This conversion may be performed by using a conversion matrix rather than by using the conversion table 51. Then, these image data 52 are converted into image data of Y, M, C, K by an undercolor removing circuit 53, in which a black image area including characters and a background portion by register of Y, M, C is converted into black (K) image data. Then, these image data are applied to an MTF correcting circuit 54 through a tone correcting circuit 55 to a screen generating circuit. The undercolor removing circuit 53 functions to perform processing of converting a black image area by register of Y, M, C of the Y, M, C image data into black (K) image data.

Figure 22:
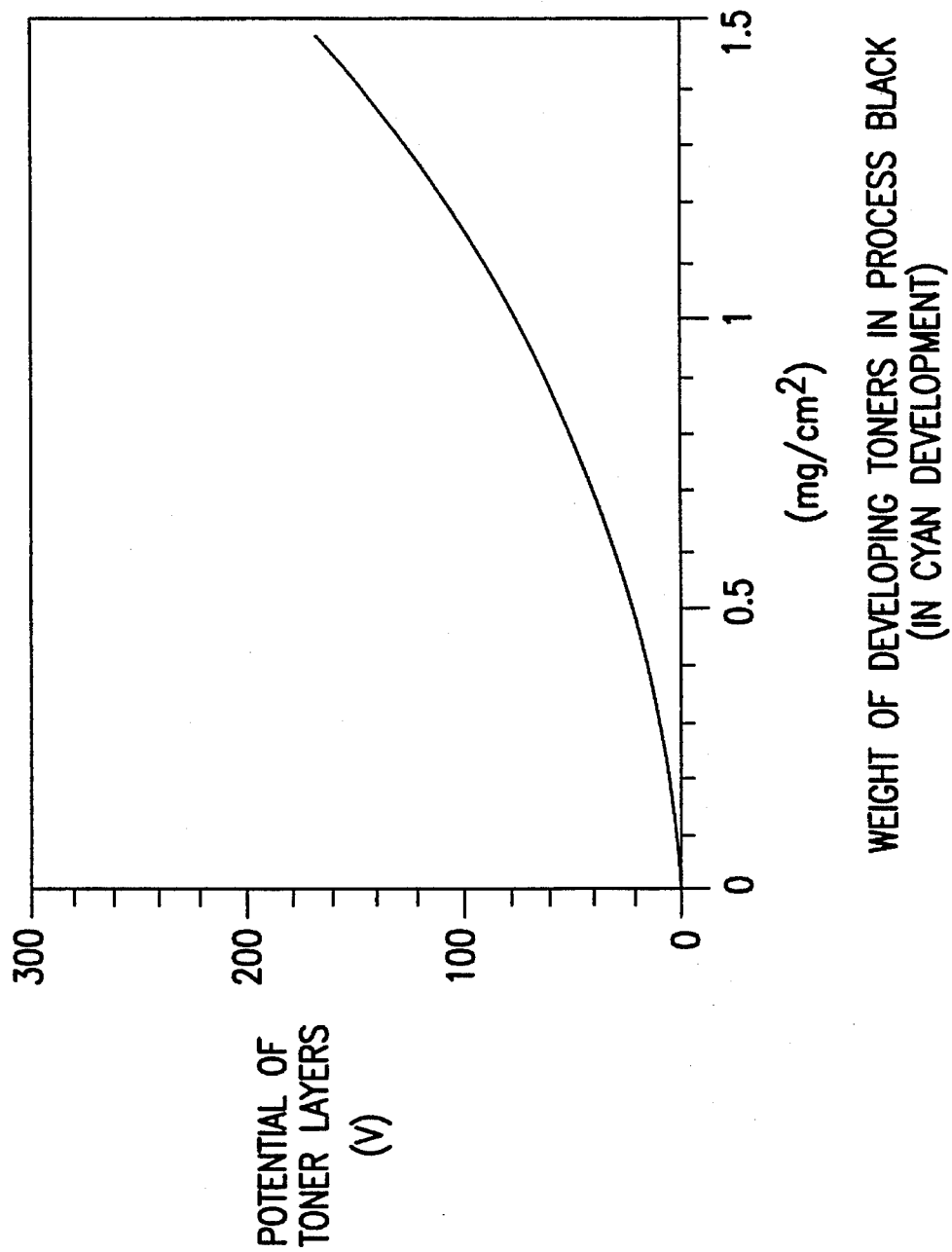
FIG. 22 is a graph showing the relation between the weight of developing toners and the potential of toner layers according to a sixth preferred embodiment of the present invention.
Figure 24:
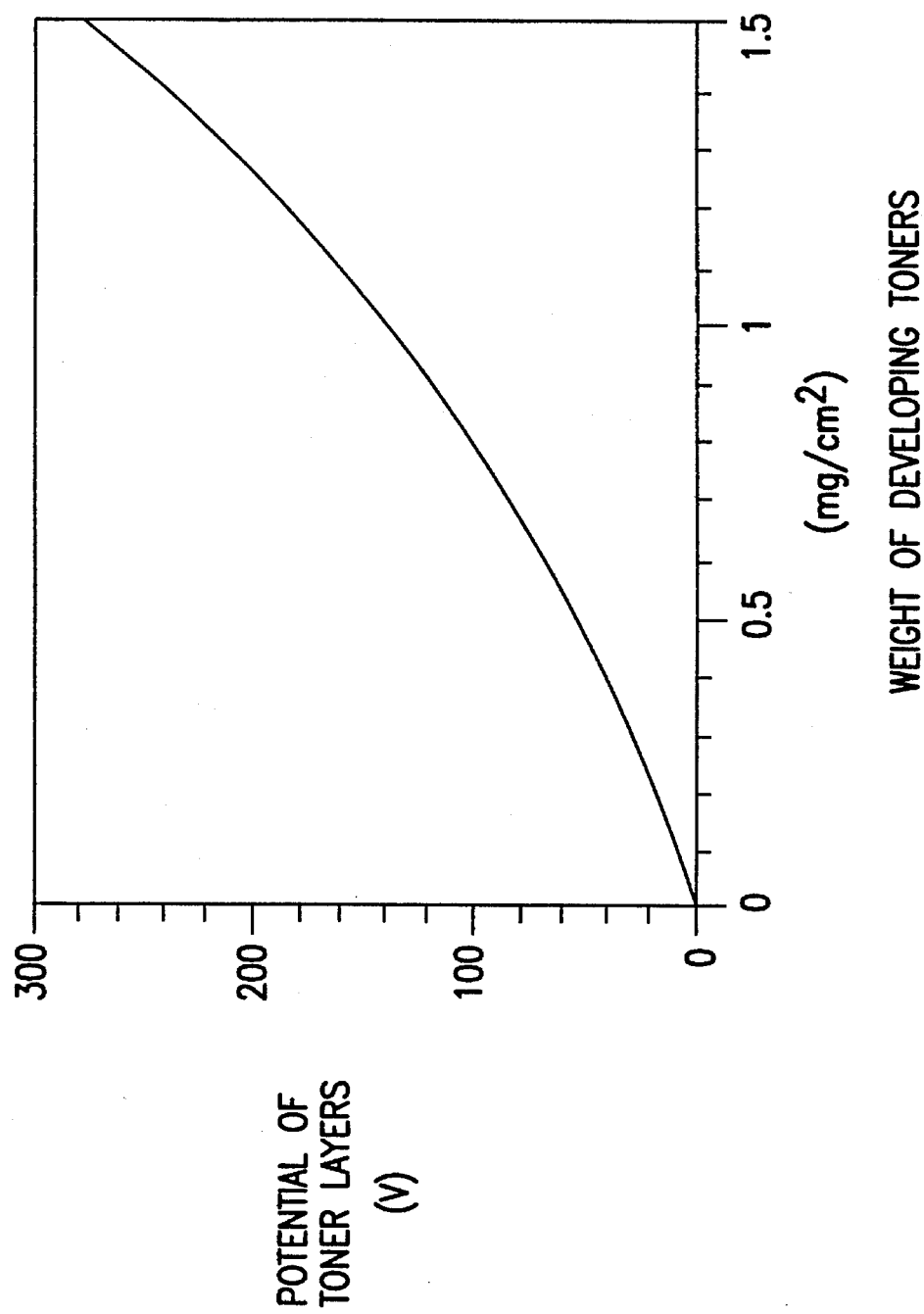
FIG. 24 is a graph showing the relation between the weight of developing toners and the potential of toner layers in the conventional color image forming apparatus.

In this manner, undercolor removal is applied as a method for reducing the weight of the developing toners itself by converting a given weight of toners into black, thereby expecting further improvement. In other words, an increase in proportion of the undercolor removal causes a decrease in total height of the toner images to thereby suppress the potential of the toner layers. FIG. 22 shows the relation between the potential of the toner layers and the weight of the developing toners in a process black area (obtained by development of Y, M, C) in development of cyan. As shown in FIG. 22, the potential of the toner layers can be suppressed by increasing the proportion of the undercolor removal to 50% or more, thus allowing faithful reproduction even in view of a residual potential of the photosensitive drum 21. Accordingly, the image quality can be further improved.

The other constitution and operation in the sixth preferred embodiment are similar to those in the first preferred embodiment, and the explanation thereof will accordingly be omitted herein.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In a color image forming apparatus for forming a color image, including charging means for uniformly charging a surface of a photosensitive medium, exposing means for exposing said surface of said photosensitive medium charged by said charging means to a light beam scanning according to image information to form electrostatic latent images, and a plurality of developing means for selectively developing said electrostatic latent images formed on said photosensitive medium with toners of plural colors, wherein charging, exposure, and development on said photosensitive medium are repeated plural times to form toner images of a given number of colors, and said toner images of said given number of colors are collectively transferred onto a recording medium; the improvement wherein a screen of each of said electrostatic latent images to be formed by said exposing means has a parallel lines structure, and phases of said electrostatic latent images each having said parallel lines structure for at least two different colors are made different from each other.

2. A color image forming apparatus according to claim 1, wherein said plural colors of said toners comprise yellow, magenta, cyan, and black, and said phases of said electrostatic latent images for said yellow, said magenta, and said cyan are made different from each other.

3. A color image forming apparatus according to claim 2, wherein a product of the number of screen lines represented by the number of parallel lines of said parallel lines structure per inch and a space between said parallel lines forming said electrostatic latent images for two colors of said yellow, said magenta, and said cyan represented by a maximum phase shift of said two colors is not greater than 0.012 provided that a unit of measure of said space is meter, and said space is not greater than 0.00012 meter.

4. A color image forming apparatus according to claim 1, wherein said phases of said electrostatic latent images are shifted from each other by said exposing means.

5. A color image forming apparatus according to claim 4, wherein said exposing means has at least one of a scan start detecting circuit and a scan end detecting circuit, and said phases of said electrostatic latent images are shifted from each other by changing an intensity of said light beam entering at least one of said scan start detecting circuit and said scan end detecting circuit in forming said electrostatic latent images for said given number of colors.

6. A color image forming apparatus according to claim 4, wherein said exposing means has at least one of a scan start detecting circuit and a scan end detecting circuit, and said phases of said electrostatic latent images are shifted from each other by an output signal from a computing circuit according to a detection signal from at least one of said scan start detecting circuit and said scan end detecting circuit.

7. A color image forming apparatus according to claim 2, wherein image processing means is provided to perform tone correction processing to an image signal to be transmitted to said exposing means, wherein tone correction data for said yellow, said magenta, and said cyan are different from each other.

8. A color image forming apparatus according to claim 1, wherein image processing means is provided to perform undercolor removal processing to an image signal to be transmitted to said exposing means, wherein a proportion of undercolor removal is not less than 50%.

9. A color image forming apparatus according to claim 2, wherein said phase of said electrostatic latent image having said parallel lines structure for said black is identical with said phase of said electrostatic latent image having said parallel lines structure for one of said yellow and said magenta.

* * * * *